(12) United States Patent
Kawakami

(10) Patent No.: US 9,758,213 B2
(45) Date of Patent: Sep. 12, 2017

(54) ELECTRIC ASSIST BICYCLE

(71) Applicant: Panasonic Intellectual Property Management Co., Ltd., Osaka-shi, Osaka (JP)

(72) Inventor: Masafumi Kawakami, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/904,526

(22) PCT Filed: Jul. 16, 2013

(86) PCT No.: PCT/JP2013/004323
§ 371 (c)(1),
(2) Date: Jan. 12, 2016

(87) PCT Pub. No.: WO2015/008314
PCT Pub. Date: Jan. 22, 2015

(65) Prior Publication Data
US 2016/0167733 A1    Jun. 16, 2016

(51) Int. Cl.
*B62M 6/55* (2010.01)
*B62M 6/50* (2010.01)
(Continued)

(52) U.S. Cl.
CPC ............ *B62M 6/55* (2013.01); *B62M 6/50* (2013.01); *B62M 6/70* (2013.01); *B62M 9/12* (2013.01)

(58) Field of Classification Search
CPC . B62M 6/55; B62M 9/12; B62M 6/70; B62M 6/50; B62M 23/02; B62M 11/16
See application file for complete search history.

(56) References Cited

U.S. PATENT DOCUMENTS 5,758,736 A * 6/1998 Yamauchi ............... B62M 6/45
                                                              180/206.4
5,984,038 A  11/1999 Fujiwara et al.
(Continued)

FOREIGN PATENT DOCUMENTS

CN      1148559 A     4/1997
CN      1201875 A    12/1998
(Continued)

OTHER PUBLICATIONS

International Search Report issued in PCT/JP2013/004323 on Aug. 27, 2013 (1 page).
(Continued)

*Primary Examiner* — Jacob D Knutson
*Assistant Examiner* — Gabriela C Craciun
(74) *Attorney, Agent, or Firm* — Hamre, Schumann, Mueller & Larson, P.C.

(57) ABSTRACT

Provided is an electric assist bicycle that can apply a sufficient auxiliary driving force with a satisfactory gear change, preclude problems caused by interference between a mount or a battery and a front derailleur, and prevent a reduction in torque transmission efficiency. A cylindrical human-power transmission member that receives a transmitted human driving force is disposed on the outer periphery of a crank shaft, and a combined-force transmission member that receives the combined force of a human driving force and an auxiliary driving force from a motor is disposed on the outer periphery of the crank shaft. The electric assist bicycle includes a speed reduction mechanism that has pairs of reduction gears and a selection clutch engageable with the reduction gears, combines the human driving force and the auxiliary driving force, and changes gears for the combined force of the human driving force and the auxiliary driving force.

7 Claims, 15 Drawing Sheets

(51) Int. Cl.
*B62M 6/70* (2010.01)
*B62M 9/12* (2006.01)

(56) References Cited

U.S. PATENT DOCUMENTS

| | | | | |
|---|---|---|---|---|
| 6,012,538 | A * | 1/2000 | Sonobe | B62M 6/45 180/206.3 |
| 6,196,347 | B1 * | 3/2001 | Chao | B62M 6/50 180/206.2 |
| 6,276,475 | B1 * | 8/2001 | Nakanosono | B62M 6/65 180/65.8 |
| 6,296,072 | B1 * | 10/2001 | Turner | B62M 6/55 180/206.2 |
| 6,516,908 | B2 * | 2/2003 | Tseng | B62M 6/55 180/206.2 |
| 7,148,582 | B2 * | 12/2006 | Matsueda | B62M 11/16 290/1 C |
| 7,472,770 | B2 * | 1/2009 | Tomoshige | B62M 6/65 180/65.51 |
| 7,770,682 | B2 * | 8/2010 | Spanski | B62K 11/00 180/205.4 |
| 8,636,095 | B2 * | 1/2014 | Ito | B62M 6/65 180/206.6 |
| 8,651,993 | B1 * | 2/2014 | Watarai | B62M 6/55 475/205 |
| 8,657,047 | B2 * | 2/2014 | Urabe | B62M 6/65 180/220 |
| 8,720,622 | B2 * | 5/2014 | Ito | B62M 6/65 180/65.51 |
| 8,777,791 | B1 * | 7/2014 | Hino | B62M 6/55 180/206.4 |
| 9,017,201 | B2 * | 4/2015 | Hino | B62M 11/04 475/5 |
| 9,114,851 | B2 * | 8/2015 | Schneider | B62M 6/60 |
| 9,228,652 | B2 * | 1/2016 | Nishikawa | B62M 1/36 |
| 9,254,890 | B2 * | 2/2016 | Deleval | B62M 6/55 |
| 9,302,734 | B2 * | 4/2016 | Getta | B62M 6/55 |
| 9,428,245 | B2 * | 8/2016 | Nishikawa | B62M 6/55 |
| 9,428,246 | B2 * | 8/2016 | Kitamura | B62M 25/08 |
| 2003/0141126 | A1 | 7/2003 | Hays et al. | |
| 2006/0287151 | A1 * | 12/2006 | Takeda | B62J 6/12 475/5 |
| 2011/0009231 | A1 * | 1/2011 | Shoge | B60B 27/0005 475/297 |
| 2011/0186372 | A1 * | 8/2011 | Juan | B62M 23/02 180/205.1 |
| 2012/0097467 | A1 * | 4/2012 | Maeno | B62M 6/55 180/206.7 |
| 2012/0165150 | A1 * | 6/2012 | Chan | B62M 6/55 475/8 |
| 2012/0305325 | A1 * | 12/2012 | Ito | B62M 6/65 180/206.6 |
| 2013/0260958 | A1 * | 10/2013 | Wang | B62M 6/55 477/5 |
| 2014/0166385 | A1 * | 6/2014 | Arimune | B62M 6/45 180/206.3 |
| 2015/0191215 | A1 | 7/2015 | Kawakami et al. | |

FOREIGN PATENT DOCUMENTS

| | | |
|---|---|---|
| CN | 201179951 Y | 1/2009 |
| JP | 10-250673 A | 9/1998 |
| JP | 11-240481 A | 9/1999 |
| JP | 2000-6877 A | 1/2000 |
| JP | 2009-208710 A | 9/2009 |
| JP | 5202769 B1 | 6/2013 |

OTHER PUBLICATIONS

Chinese Office Action, Chinese Patent Application No. 201380078053.9, dated Jun. 1, 2017 (6 pages).

* cited by examiner

ELECTRIC ASSIST BICYCLE

TECHNICAL FIELD

The present invention relates to an electric assist bicycle capable of traveling with a combination of a human driving force generated by a pedal force from a pedal and an auxiliary driving force generated by a motor.

BACKGROUND ART

In a known electric assist bicycle including a motor, power is fed from a power storage such as a battery, a human driving force, which includes a pedal force applied to a pedal, is detected by a torque sensor, and an auxiliary driving force (assisting force) of the motor is added according to the human driving force. Thus, such an electric assist bicycle can smoothly travel on an uphill or the like.

In such an electric assist bicycle, a motor drive unit including the motor is disposed at a crank shaft. Moreover, the electric assist bicycle configured thus has a relatively heavy motor drive unit that is disposed at a low position at the center of the electric assist bicycle (that is, the intermediate point between the front wheel and the rear wheel) in the longitudinal direction thereof. Thus, the front and rear wheels of the electric assist bicycle configured thus can be more easily lifted than an electric assist bicycle having a motor in the hub of the front or rear wheel. Such an electric assist bicycle can easily pass over a step of a path, achieving ease of handling and high riding stability.

Motor drive units to be provided in such an electric assist bicycle are broadly classified into a so-called double-shaft motor drive unit 100 that includes, as shown in FIG. 14, an auxiliary-driving force output sprocket 103 that outputs an auxiliary driving force from a motor in addition to a driving sprocket (also called a front sprocket or a chain sprocket) 102 serving as a human driving force output wheel disposed near one end of a crank shaft 101, and a so-called single-shaft motor drive unit 200, as shown in FIGS. 15 and 16, in which a human driving force generated by a pedal force and an auxiliary driving force generated by a motor are combined in the motor drive unit 200 and the combined force is outputted from a driving sprocket 201.

The double-shaft motor drive unit 100 is disclosed in, for example, Patent Literature 1. As shown in FIG. 14, the auxiliary-driving force output sprocket 103 protrudes to the outside of a unit case 104 of the motor drive unit 100 from a portion behind the driving sprocket 102 in the motor drive unit 100. The driving sprocket 102 that outputs a human driving force and the auxiliary-driving force output sprocket 103 that outputs an auxiliary driving force are engaged with a chain 105 serving as an endless driving force transmission member. The human driving force and the auxiliary driving force are combined by the chain 105 and then the combined force is transmitted to the rear wheel.

Further behind the auxiliary-driving force output sprocket 103, a tensioner device (also called a guide device) 106 is provided in engagement with the chain 105, which has been engaged with the auxiliary-driving force output sprocket 103, so as to guide the chain 105 downward. Moreover, a tension sprocket 107 provided in the tensioner device 106 increases the winding angle of the chain 105 engaged with the auxiliary-driving force output sprocket 103.

Meanwhile, the so-called single-shaft motor drive unit 200 is disclosed in, for example, Patent Literature 2. As shown in FIGS. 15 and 16, the outer periphery of a crank shaft 202 that receives a human driving force transmitted from the pedal has a cylindrical human-power transmission member 203 that receives the human driving force transmitted by serration coupling and so on, and a combined force member 205 where the human driving force transmitted via the human-power transmission member 203 is combined with an auxiliary driving force from a motor 204. Moreover, the human driving force from the human-power transmission member 203 is transmitted to the combined force member 205 via a one-way clutch 206. A large-diameter gear 205a that receives an auxiliary driving force from the motor 204 via a speed reduction mechanism 207 is formed on one end of the combined force member 205, whereas the driving sprocket 201 is attached to another end of the combined force member 205, the driving sprocket 201 serving as a driving force output wheel engaged with a chain 208 serving as an endless driving force transmission member. A combined force on the combined force member 205 is transmitted from the driving sprocket 201 to the rear wheel through the chain 208.

As shown in FIGS. 15 and 16, the single-shaft motor drive unit 200 is configured such that only the driving sprocket 201 is engaged with the chain 208 and the combined force of a human driving force and an auxiliary driving force is transmitted to the chain 208. In contrast, the double-shaft motor drive unit 100 needs to engage, as shown in FIG. 14, the driving sprocket 102 for transmitting a human driving force, the auxiliary-driving force output sprocket 103 for transmitting an auxiliary driving force, and the tension sprocket 107 with the chain 105.

Thus, the area of the single-shaft motor drive unit 200 in side view (laterally projected area) can be advantageously smaller (can be made compact) than that of the double-shaft motor drive unit 100 by devising the layout of the motor 204 and the speed reduction mechanism 207. A so-called front derailleur can be attached to the single-shaft motor drive unit 200 including the driving sprocket 201 with multiple stages. On the other hand in the double-shaft motor drive unit 100, it is necessary to engage the driving sprocket 102, the auxiliary-driving force output sprocket 103, and the tension sprocket 107 with the chain 105, leading to difficulty in attaching the front derailleur.

Moreover, the single-shaft motor drive unit 200 advantageously eliminates the need for providing the tensioner device 106 of the tension sprocket 107 or the like. Generally, braking devices used for electric assist bicycles include a rim brake, a band brake, and a roller brake that are operated with a brake lever attached to a handle bar as those of ordinary bicycles. Depending on the regions or the request of an operator, the attachment of a coaster brake to the rear wheel may be required. The coaster brake is operated by rotating the pedals opposite to a forward rotation direction. In this case, the pedals rotated in the opposite direction apply a tension that pulls the lower part of the chain forward. Thus, the double-shaft motor drive unit 100 needs a unique design for the tensioner device 106, whereas the single-shaft motor drive unit 200 advantageously eliminates the need for such a unique design.

Typically, in the foregoing advantageous single-shaft motor drive unit 200, a magneto-striction torque sensor 209 for detecting a human driving force is provided on the outer periphery of the human-power transmission member 203, which receives a human driving force transmitted from the crank shaft 202, and a portion opposed to the outer periphery. Specifically, a magneto-striction generation portion 209b is formed on the outer periphery of the human-power transmission member 203, and a coil 209a for detecting a change of magnetism on the magneto-striction generation portion 209b is disposed to oppose to the magneto-striction generation portion 209b. When the right and left pedals are pressed, the crank shaft 202 is twisted by a pedal force (human driving force). Thus, the twisted state of the human-power transmission member 203 that receives a human driving force transmitted from the crank shaft 202 is detected by the torque sensor 209.

If a front derailleur is attached to the single-shaft motor drive unit 200, an external derailleur for a sport bicycle or the like may be provided on the side of the crank shaft. Specifically, a plurality of driving sprockets may be disposed in the location of the driving sprocket 201 shown in FIG. 16 so as to be displaced from each other along the axial direction of the crank shaft 202 (also referred to as a vehicle width direction) and a front derailleur that moves the chain in the vehicle width direction may be provided near the driving sprockets.

CITATION LIST

Patent Literatures

Patent Literature 1: Japanese Patent Laid-Open No. 2009-208710
Patent Literature 2: Japanese Patent Laid-Open No. 10-250673

SUMMARY OF INVENTION

Technical Problems

However, the foregoing single-shaft motor drive unit including the external derailleur may cause the following problems:

First, the driving sprockets are laterally disposed and the chain is switched among the driving sprockets. Thus, the chain needs to have smaller dimensions (small thickness) in the vehicle width direction than an ordinary chain. However, in such an electric assist bicycle, the combined force of a human driving force and an auxiliary driving force is applied to the chain. Thus, the chain having smaller dimensions (small thickness) in the vehicle width direction than the ordinary chain may have quite a short life expectancy, causing frequent replacement of components or an insufficient auxiliary driving force.

Generally, a front derailleur is provided diagonally above and behind the driving sprocket. A battery mount and a battery are disposed in this location of the electric assist bicycle and thus these components (the mount and the battery) may interfere with the front derailleur. This may lead to difficulty in satisfactorily arranging the components and the front derailleur.

Since the front derailleur is exposed to the outside, the front derailleur or an engaging portion between the chain and the front derailleur may come into contact with obstacles during traveling. This may cause damage or take off the chain, reducing reliability.

Furthermore, in such an electric assist bicycle, the combined force of a human driving force and an auxiliary driving force is applied to the chain. The front derailleur needs to be developed as a special front derailleur capable of switching in response to a large torque.

The external derailleur provided in the single-shaft motor drive unit may be replaced with a derailleur having a planet gear mechanism. In this case, the use of the planet gear mechanism may reduce torque transmission efficiency.

The present invention has been devised to solve the problems. An object of the present invention is to provide an electric assist bicycle that can prevent an increase in the frequency of replacement of components such as a chain with a satisfactory gear change, add a sufficient auxiliary driving force, prevent problems caused by interference between a mount or a battery and a front derailleur, eliminate the need for developing a special front derailleur, and prevent a reduction in torque transmission efficiency.

Solution to Problem

In order to solve the problems, the present invention is an electric assist bicycle including a motor drive unit with a motor disposed at the intermediate position between a front wheel and a rear wheel, the electric assist bicycle being capable of traveling with a combination of a human driving force generated by a pedal force from a pedal and an auxiliary driving force generated by the motor, the electric assist bicycle including a crank shaft that receives a human driving force transmitted from the pedal and rotates about a different axis from the motor, the crank shaft having a cylindrical human-power transmission member on the outer periphery of the crank shaft, the human-power transmission member receiving the transmitted human driving force, the crank shaft having a combined-force transmission member on the outer periphery of the crank shaft, the combined-force transmission member receiving a combined force of a human driving force and an auxiliary driving force from the motor, the electric assist bicycle including a speed reduction mechanism that has pairs of reduction gears and a selection clutch engageable with the reduction gears, combines the human driving force and the auxiliary driving force, and changes gears for the combined force of the human driving force and the auxiliary driving force, the motor drive unit containing the human-power transmission member, the combined-force transmission member, and the speed reduction mechanism, wherein the combined force transmitted to the combined-force transmission member through the speed reduction mechanism is transmitted to the rear wheel through a driving force output wheel coaxial with the crank shaft and an endless driving force transmission member looped over the human driving force output wheel.

With this configuration, the selection clutch of the speed reduction mechanism is engaged with selected one of the reduction gears. A combined force transmitted to the combined-force transmission member through the speed reduction mechanism is transmitted to the rear wheel through the driving force output wheel coaxial with the crank shaft and the endless driving force transmission member looped over the human driving force output wheel.

The speed reduction mechanism of the present invention includes a human-power transmitting reduction gear that is rotatably disposed on the outer periphery of the crank shaft and receives a transmitted human driving force, an intermediate shaft disposed in parallel with the crank shaft, a plurality of intermediate-shaft reduction gears provided on the intermediate shaft, a combined-force reduction gear rotatably provided in engagement with the intermediate reduction gear, and a selection clutch that is rotated integrally with the combined-force transmission member engaged with the selection clutch and is selectively engaged with one of the human-power transmitting reduction gear and the combined-force reduction gear.

With this configuration, the selection clutch is selectively engaged with the human-power transmitting reduction gear or the combined-force reduction gear. This can satisfactorily transmit a combined force to the rear wheel while changing gears. Moreover, the combined force of a human driving force and an auxiliary driving force is transmitted with the engagement of the intermediate-shaft reduction gears provided on the intermediate shaft, the human-power transmitting reduction gear rotatably provided on the outer periphery of the crank shaft, and the combined-force reduction gear rotatably provided on the combined-force transmission member. This can improve the transmission efficiency of a torque (force) as compared with the use of a planet gear mechanism.

According to the present invention, the human-power transmission member has the magneto-striction generation portion of a torque sensor for detecting the human driving force formed.

The electric assist bicycle may include a one-way clutch for interrupting an auxiliary driving force on the transmission path of a human driving force between the crank shaft and the human-power transmitting reduction gear, the one-way clutch preventing the transmission of an auxiliary driving force from the motor to the crank shaft. In this case, an interlocking cylindrical part may be disposed on the outer periphery of the crank shaft so as to be engaged with the human-power transmission member, and the one-way clutch for interrupting an auxiliary driving force may be disposed between the interlocking cylindrical part and the human-power transmitting reduction gear.

With this configuration, the interlocking cylindrical part is provided between the human-power transmission member and the human-power transmitting reduction gear. Also in the case where the magneto-striction generation portion of the torque sensor for detecting a human driving force is formed on the human-power transmission member, vibrations during the switching of the selection clutch and vibrations from the one-way clutch for interrupting an auxiliary driving force are hardly transmitted to the human-power transmission member. Thus, the torque sensor can be more reliable than in the absence of the interlocking cylindrical part.

The electric assist bicycle may further include a rotation detector that detects the rotation of the interlocking cylindrical part or the human-power transmission member. This configuration can detect the rotation of the interlocking cylindrical part or the human-power transmission member, that is, the rotation of the crank shaft.

A one-way clutch does not need to be provided on the transmission path of a human driving force between the crank shaft and the human-power transmitting reduction gear. In this case, the human-power transmission member and the human-power transmitting reduction gear are also rotated in response to the rotation of the crank shaft regardless of the rotation direction of the crank shaft and the human-power transmission member relative to the human-power transmitting reduction gear. Thus, also in the case where the hub of the rear wheel has, for example, a coaster brake that operates when the pedals are rotated opposite to a forward rotation direction, a reversed rotation of the crank shaft from a forward rotation is transmitted to the coaster brake. This can satisfactorily operate the coaster brake.

Advantageous Effects of Invention

According to the present invention, the speed reduction mechanism provided in the motor drive unit includes the pairs of reduction gears and the selection clutch engageable with the reduction gears. The speed reduction mechanism combines the human driving force and the auxiliary driving force and changes gears for the combined force of the human driving force and the auxiliary driving force. This eliminates the need for a chain having small dimensions (small thickness) relative to a vehicle width direction for providing an external derailleur in a single-shaft motor drive unit, thereby preventing a chain from having quite a short life expectancy that may cause frequent replacement of components or, an insufficient auxiliary driving force. Furthermore, the need for a front derailleur is eliminated and thus any problems do not arise as to the location of a front derailleur. Furthermore, the human-power transmission member, the combined-force transmission member, and the speed reduction mechanism are provided in the motor drive unit so as to be protected from the outside, achieving higher reliability.

The speed reduction mechanism includes the human-power transmitting reduction gear that is rotatably disposed on the outer periphery of the crank shaft and receives a transmitted human driving force, the intermediate shaft disposed in parallel with the crank shaft, the intermediate-shaft reduction gears provided on the intermediate shaft, the combined-force reduction gear rotatably provided on the combined-force transmission member into engagement with the intermediate reduction gear, and the selection clutch that is rotated integrally with the combined-force transmission member engaged with the selection clutch and is selectively engaged with the human-power transmitting reduction gear or the combined-force reduction gear. This can satisfactorily transmit a combined force to the rear wheel while changing gears. Moreover, a combined force can be outputted to the driving force output wheel of the driving sprocket or the like with higher torque (force) transmission efficiency than in the use of a planet gear mechanism.

BRIEF DESCRIPTION OF DRAWINGS

FIG. 6(a) is a side sectional view taken along line A-A of FIG. 5, FIG. 6(b) is a side sectional view taken along line B-B of FIG. 5, and FIG. 6(c) is a side sectional view taken along line C-C of FIG. 5.

DESCRIPTION OF EMBODIMENTS

An electric assist bicycle according to an embodiment of the present invention will be described below with reference to the accompanying drawings. In the following explanation, a lateral direction and a longitudinal direction are set relative to the traveling direction of a rider on an electric assist bicycle 1. The present invention is not limited to the following configuration.

Figure 1:
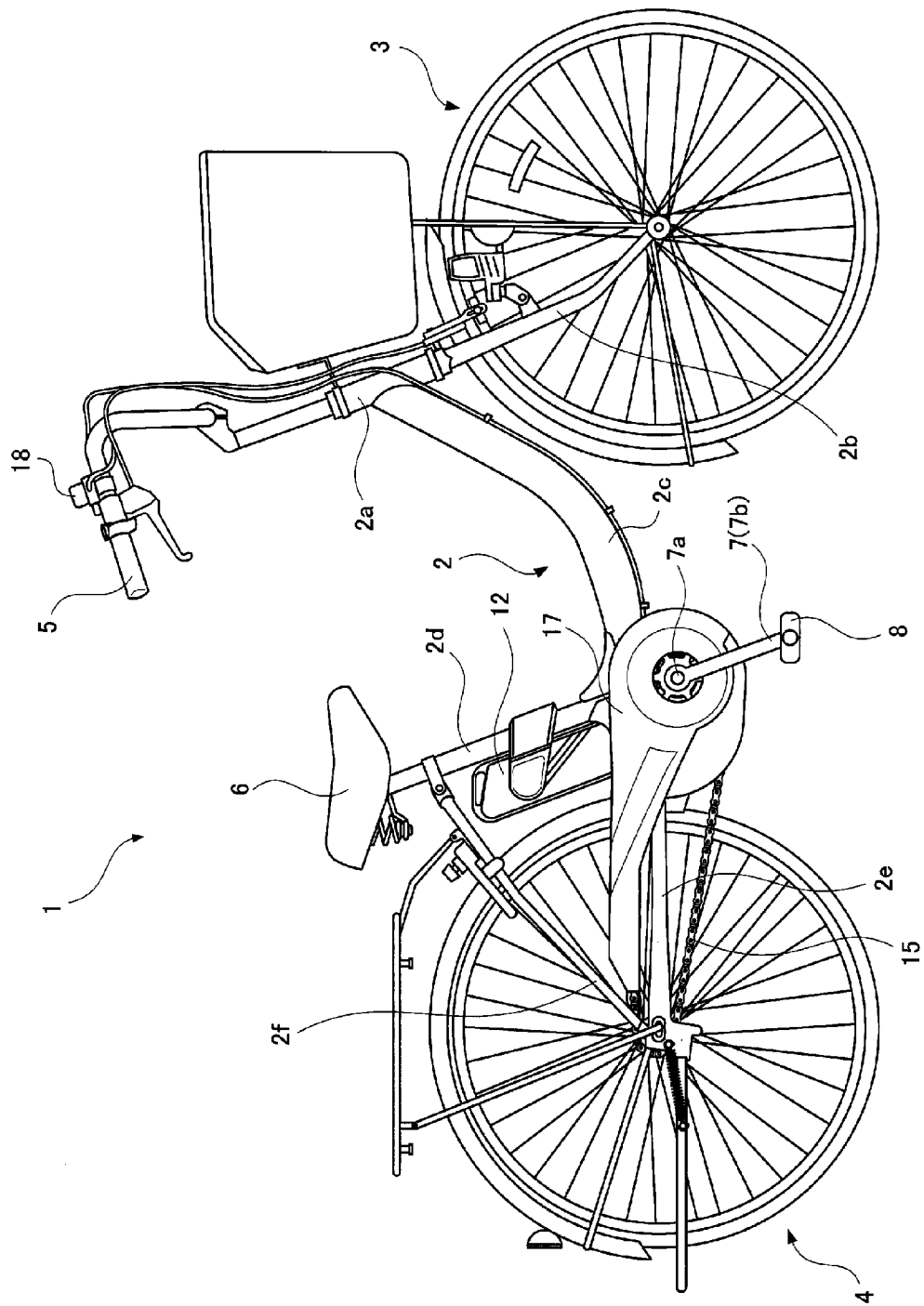
FIG. 1 is an overall side view showing an electric assist bicycle according to an embodiment of the present invention.
Figure 2:
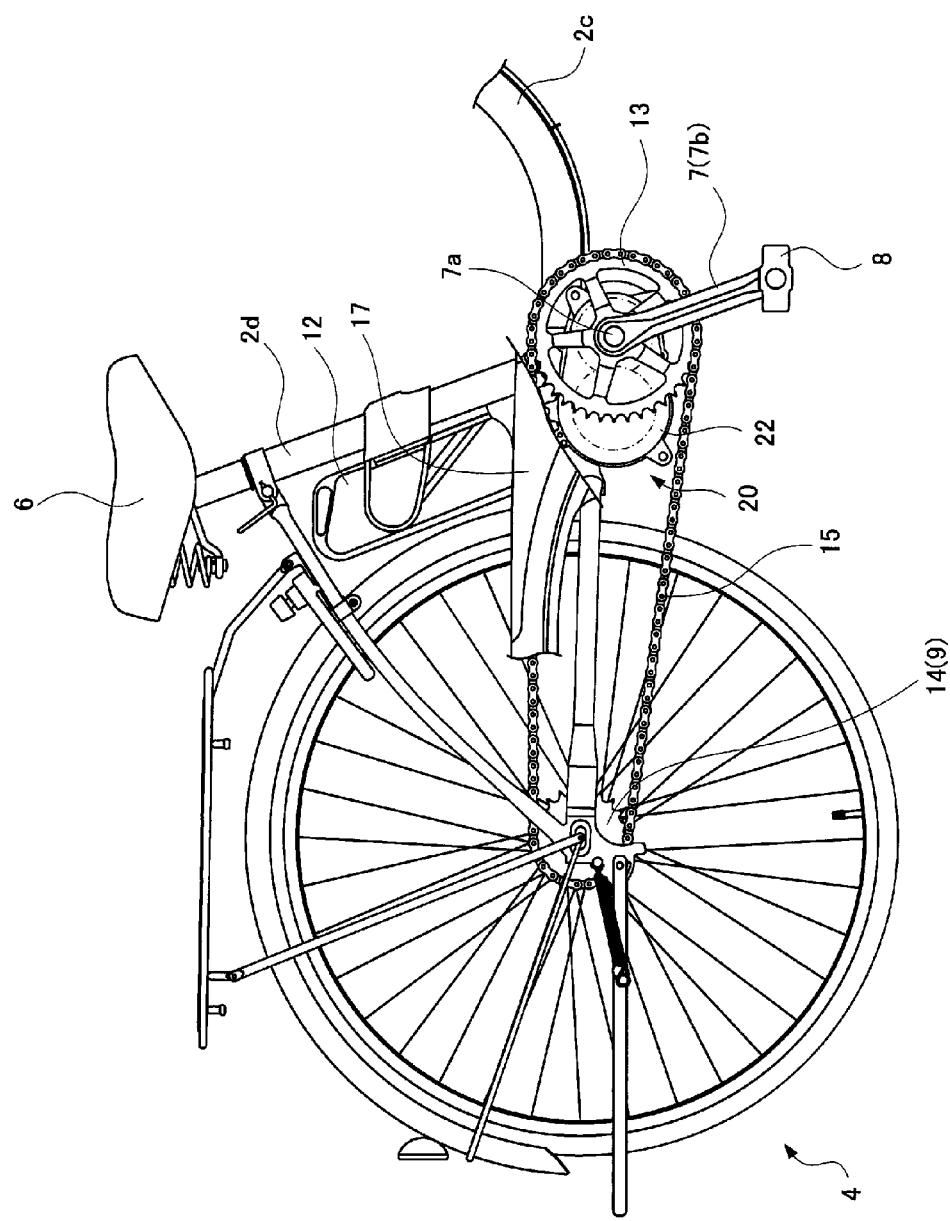
FIG. 2 is a partially cut side view of the electric assist bicycle.

In FIGS. 1 and 2, reference numeral 1 denotes the electric assist bicycle according to the embodiment of the present invention. As shown in FIGS. 1 and 2, the electric assist bicycle 1 includes: a metallic frame 2 including a head tube 2a, a front fork 2b, a main tube 2c, a seat tube 2d, a chain stay 2e, and a seat stay 2f; a front wheel 3 rotatably attached to the lower end of the front fork 2b; a rear wheel 4 rotatably attached to the rear end of the chain stay 2e; a handle bar 5 that changes the direction of the front wheel 3; a saddle 6; a crank 7 and pedals 8 that receive a human driving force including a pedal force; a motor drive unit 20 including an electric motor 21 (FIG. 4) serving as a driving source for generating an auxiliary driving force (assist force) and a control unit 24 (FIG. 4) for electrically controlling the motor 21 and so on; a battery 12 including a secondary battery for supplying driving power to the motor 21; a manual gear change part (not shown) 18 for setting the speed (first or second speed) of a gear changer (gear changing unit), which will be discussed later, the manual gear change part 18 being attached to the handle bar 5 or the like so as to be operated by a rider; a manual operation part (not shown) for switching the power supply of the electric assist bicycle 1 and setting a riding mode, the manual operation part being attached to the handle bar 5 or the like so as to be operated by a rider and so on; a driving sprocket (may be called a front sprocket, a crank sprocket, or a front gear) 13 that is attached so as to coaxially rotate with a crank shaft 7a and serves as a driving force output wheel for outputting the combined force of a human driving force and an auxiliary driving force; a rear sprocket (may be called a rear gear) 14 serving as a rear wheel attached to a hub (also called a rear hub) 9 of the rear wheel 4; a chain 15 serving as an endless driving force transmission member rotatably wound around the driving sprocket 13 and the rear sprocket 14 in an endless manner; and a chain cover 17 that laterally covers the chain 15 and so on. The battery 12 is an example of a power storage and is preferably a secondary battery. Another example of the power storage may be a capacitor. The crank 7 includes crank arms 7b provided on the right and left of the crank 7 and the crank shaft 7a connecting the right and left crank arms 7b. The pedals 8 are rotatably attached to the ends of the crank arms 7b.

As shown in FIGS. 1 and 2, also in the electric assist bicycle 1, the motor drive unit 20 is disposed at the intermediate position between the front wheel 3 and the rear wheel 4, for example, substantially behind the crank shaft 7a (specifically, under the intermediate position). This configuration locates the relatively heavy motor drive unit 20 at the center of the electric assist bicycle 1 in the longitudinal direction. Thus, the front wheel 3 and the rear wheel 4 are easily lifted and the electric assist bicycle 1 can easily pass over a step of a path, achieving ease of handling of the body (e.g., the frame 2) of the electric assist bicycle 1 and high riding stability.

Figure 3A:
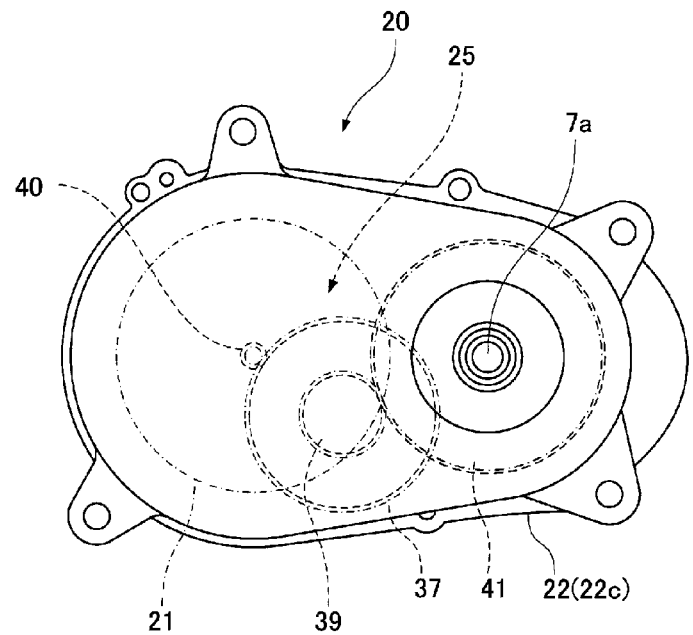
FIGS. 3(a) and 3(b) are a right side view and a right-side cross-sectional view showing the motor drive unit of the electric assist bicycle.
Figure 3B:
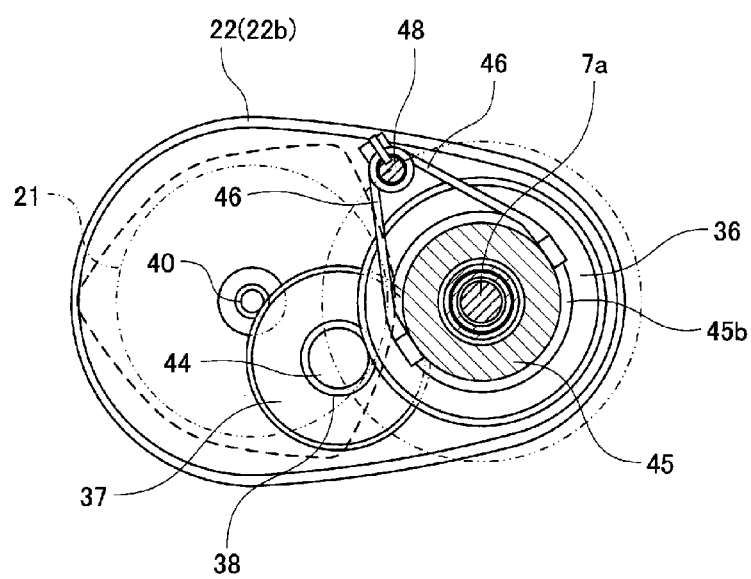
Figure 4:
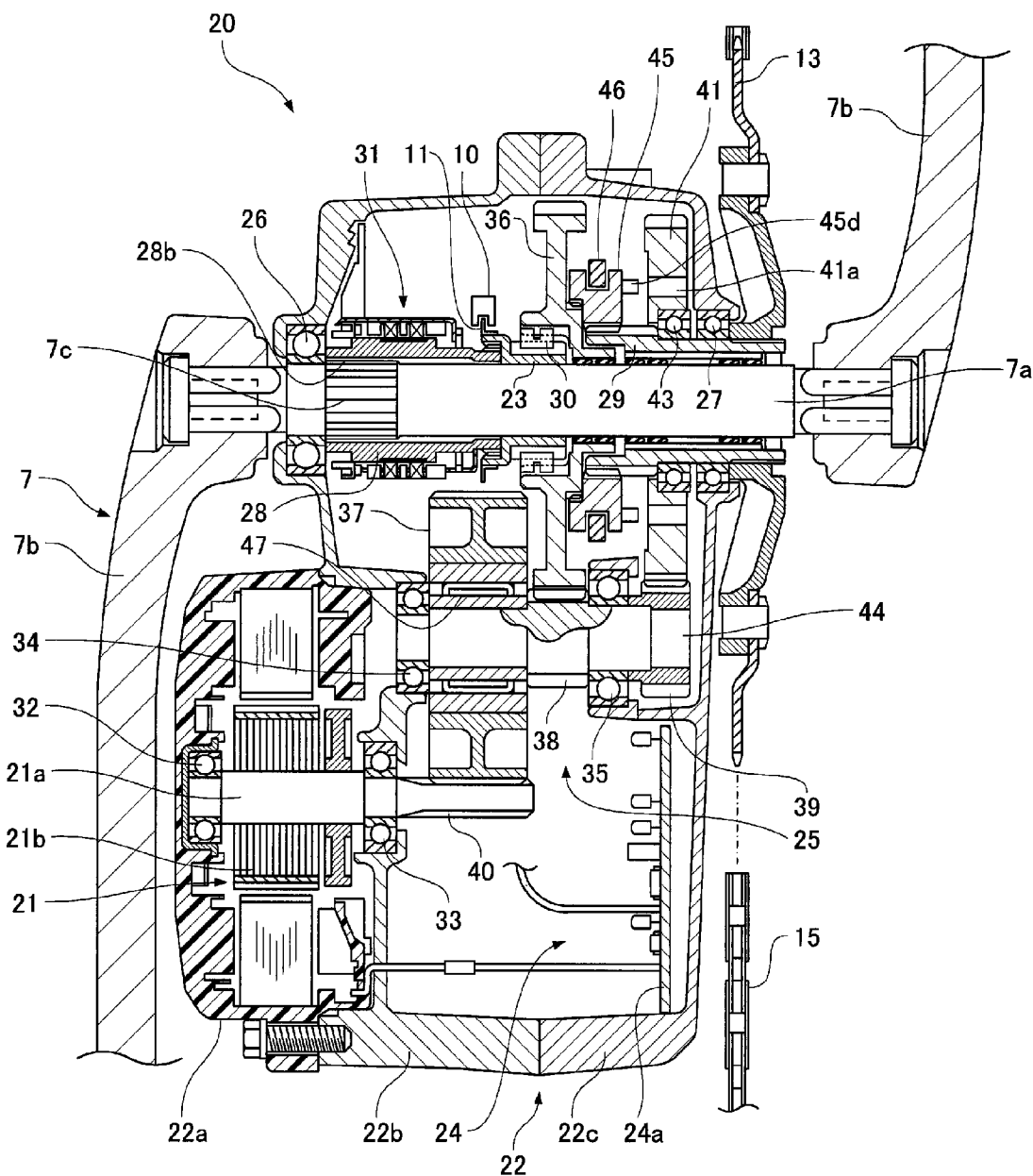
FIG. 4 is a plan sectional view showing the motor drive unit (having a two-speed gear changing unit) of the electric assist bicycle with the gear changing unit set at a first speed.

FIGS. 3(a) and 3(b) are a right side view and a right-side cross section of the motor drive unit 20. FIG. 4 is a plane section showing the motor drive unit 20.

As shown in FIGS. 3(a), 3(b), and 4, the motor drive unit 20 includes a unit case 22 constituting a casing and so on. The unit case 22 includes a motor case 22a, a left-side case 22b, and a right-side case 22c. The crank shaft 7a laterally penetrates the front of the motor drive unit 20. Moreover, the outer periphery of the crank shaft 7a has a substantially cylindrical human-power transmission member 28 that receives a human driving force transmitted from the crank shaft 7a, an interlocking cylindrical part 23 that receives the human driving force transmitted from the human-power transmission member 28, and a combined-force transmission member 29 that receives the human driving force from the interlocking cylindrical part 23 via, for example, a one-way clutch (a one-way clutch for interrupting an auxiliary driving force) 30 and transmits the combined force of the human driving force and an auxiliary driving force from the motor 21 to the driving sprocket 13.

Furthermore, a speed reduction mechanism 25 having pairs of reduction gears 36 to 41 is longitudinally disposed from the right side of the front of the unit case 22 to the center of the unit case 22. In the present embodiment, as will be discussed later, the function of an internal derailleur (internal gear changing unit) is also provided in the speed reduction mechanism 25. Moreover, the motor 21 is disposed on the left side of the rear of the unit case 22. The control unit 24 is disposed on the right side of the rear of the unit case 22 and includes a control printed circuit board 24a that has electronic components for performing kinds of electrical control and a storage containing kinds of information.

The motor drive unit 20 will be more specifically described below. As shown in, for example, FIGS. 4, 5, and 6, the crank shaft 7a laterally penetrating the front of the motor drive unit 20 is rotatably disposed with bearings 26 and 27. The cylindrical human-power transmission member 28 is fit onto the outer periphery of the left side of the crank shaft 7a via a serration part (or spline part) 7c so as to rotate as an integral part. Moreover, a serration part (or spline part) 28b is also formed at a point corresponding to the serration part (or spline part) 7c of the crank shaft 7a inside the human-power transmission member 28, and the serration part 28b is engaged with the serration part (or spline part) 7c of the crank shaft 7a.

A magneto-striction generation portion 31b having magnetic anisotropy is formed on the outer surface of the human-power transmission member 28. Coils 31a are disposed with a certain clearance (space) on the outer periphery of the magneto-striction generation portion. The magneto-striction generation portion 31*b* and the coils 31*a* constitute a magneto-striction torque sensor (human power detection part) 31. With this configuration, a human driving force from the crank shaft 7*a* is transmitted to the human-power transmission member 28 and is detected by the torque sensor 31. In the magneto-striction torque sensor 31, the magneto-striction generation portion 31*b* is spirally formed with an angle of, for example, +45° to −45° with respect to the axial direction of the human-power transmission member 28. When a human driving force is transmitted to the human-power transmission member 28, the magneto-striction generation portion 31*b* on the surface of the human-power transmission member 28 is distorted so as to vary between increased and decreased portions in magnetic permeability. Thus, a difference in the inductance of the coils 31*a* is measured so as to detect the magnitude of the torque (human driving force).

The interlocking cylindrical part 23 is disposed next to the right side of the human-power transmission member 28 on the outer periphery of the crank shaft 7*a* so as to rotate relative to the crank shaft 7*a*. The interlocking cylindrical part 23 rotates integrally with the human-power transmission member 28 while being engaged at a serration part (or spline part) 28*a* formed on the outer periphery of the right end of the human-power transmission member 28 and a serration part (or spline part) 23*a* formed on the inner periphery of the left end of the interlocking cylindrical part 23. In the present embodiment, the serration part (or spline part) 23*a* formed on the inner periphery of the left end of the interlocking cylindrical part 23 is externally fit onto the serration part (or spline part) 28*a* of the human-power transmission member 28.

Furthermore, in the present embodiment, a rotation detecting member 11 for detecting the rotational state of the interlocking cylindrical part 23 is attached to the outer periphery of the left side of the interlocking cylindrical part 23. Moreover, a rotation detector 10 is fixed to the unit case 22 so as to laterally hold the rotation detecting member 11 with a small clearance. For example, the rotation detector 10 includes a pair of optical sensors disposed along the rotation direction of the rotator 11, the optical sensor including a light emitting part and a light receiving part. The rotator 11 has a large number of teeth (light-shielding portions) extending outward like comb teeth. The teeth of the rotator 11 pass between the light emitting part and the light receiving part of the rotation detector 10, allowing the rotation detector 10 to electrically detect a light incidence state and a light shielding state. Subsequently, the amount and direction of rotation of the interlocking cylindrical part 23 are detected in the control unit 24 that receives the signal of the rotation detector 10. The optical sensor may be replaced with a magnetometric sensor to detect the amount and direction of rotation of the interlocking cylindrical part 23. In this case, the interlocking cylindrical part 23 rotates integrally with the human-power transmission member 28 while the human-power transmission member 28 rotates integrally with the crank shaft 7*a*. The detection of the amount and direction of rotation of the interlocking cylindrical part 23 allows the detection of the amounts and directions of rotations of the crank shaft 7*a* and the pedals 8.

The human-power transmitting reduction gear (one of the reduction gears) 36 provided in the speed reduction mechanism 25 is disposed on the outer periphery of the right side of the interlocking cylindrical part 23 via the one-way clutch (one-way clutch for interrupting an auxiliary driving force) 30. In riding forward with the pedals 8, a human driving force transmitted to the interlocking cylindrical part 23 is transferred to the human-power transmitting reduction gear 36 of the speed reduction mechanism 25.

As shown in FIG. 4, the motor 21 includes a rotating shaft 21*a* and a rotor portion 21*b* that are rotatably supported by bearings 32 and 33. The rotating shaft 21*a* of the motor 21 protrudes to the right so as to form the motor-shaft reduction gear 40, which will be discussed later, on the outer periphery of the protruding portion.

Figure 5:
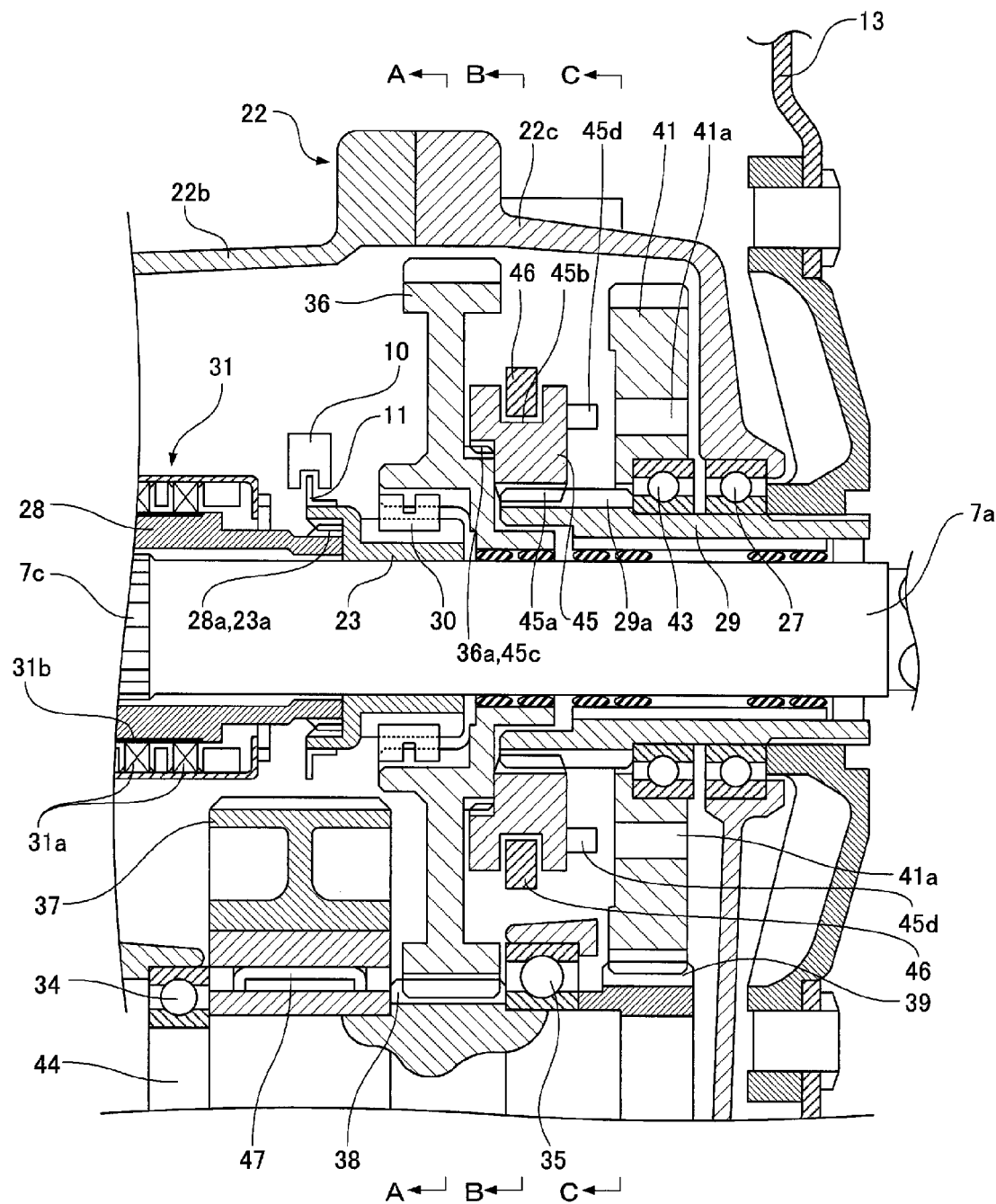
FIG. 5 is an enlarged plan sectional view showing the principal part of the motor drive unit of the electric assist bicycle.
Figure 6A:
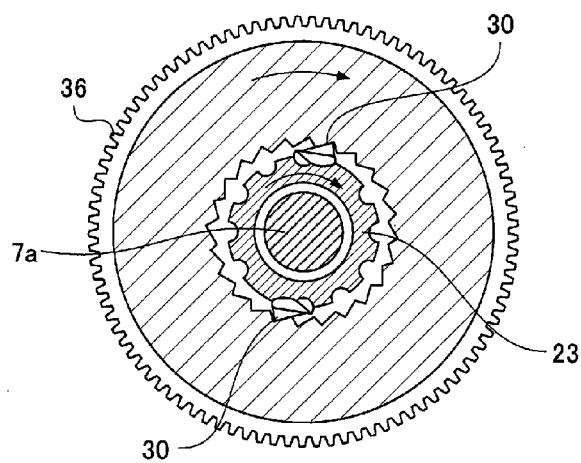
FIGS. 6(a) to 6(c) are cross-sectional views showing the motor drive unit of the electric assist bicycle.

As shown in FIGS. 4 and 5, the speed reduction mechanism 25 includes the pairs of reduction gears 36 to 41 (three pairs in the present embodiment) including the human-power transmitting reduction gear 36 and a selection clutch 45 that can be engaged with the human-power transmitting reduction gear 36 and the combined-force reduction gear 41, which will be discussed later. A human driving force transmitted through the crank shaft 7*a* and an auxiliary driving force transmitted from the motor 21 are combined and the combined force thereof changes speeds by engaging the selection clutch 45 with selected one of the reduction gears 36 and 41.

Specifically, the speed reduction mechanism 25 includes: the large-diameter human-power transmitting reduction gear 36 that is rotatably disposed on the outer periphery of the crank shaft 7*a* so as to receive a transmitted human driving force; an intermediate shaft 44 that is laterally extended at the center of the motor drive unit 20 in the longitudinal direction and is rotatably supported by bearings 34 and 35 in parallel with the crank shaft 7*a*; the first to third intermediate-shaft reduction gears 37, 38, and 39 provided on the intermediate shaft 44; the small-diameter motor-shaft reduction gear 40 that is formed on the rotating shaft 21*a* of the motor 21 and is engaged with the large-diameter first intermediate-shaft reduction gear 37; the large-diameter combined-force reduction gear 41 that is rotatably provided on the combined-force transmission member 29 via a bearing 43 and is engaged with the small-diameter third intermediate reduction gear 39; the selection clutch 45 that is integrally rotated in laterally movable engagement with the combined-force transmission member 29 via spline parts 29*a* and 45*a* (specifically, along the axial direction of the crank shaft 7*a*) and is selectively engaged with the human-power transmitting reduction gear 36 or the combined-force reduction gear 41; a clutch driving part 46 that is laterally movably engaged with a groove portion 45*b* formed on the outer periphery of the selection clutch 45 so as to laterally move the selection clutch 45 selectively into engagement with the human-power transmitting reduction gear 36 or the combined-force reduction gear 41; and a one-way clutch 47 for interrupting a human driving force, the one-way clutch 47 being disposed between the intermediate shaft 44 and the first intermediate-shaft reduction gear 37 so as to prevent the transmission of a human driving force from the human-power transmitting reduction gear 36 to the motor 21. The rotating shaft 21*a* of the motor 21 is also disposed in parallel with the crank shaft 7*a* like the intermediate shaft 44.

When the motor 21 is rotated in a predetermined direction to drive the electric assist bicycle 1 forward, the speed of rotation of the motor 21 (auxiliary driving force) is reduced (that is, the torque is increased) through an engaged portion between the small-diameter motor-shaft reduction gear 40 and the large-diameter first intermediate-shaft reduction gear 37 and then is transmitted to the intermediate shaft 44. Subsequently, the speed of rotation is further reduced through an engaged portion between the small-diameter second intermediate-shaft reduction gear 38 and the large-diameter human-power transmitting reduction gear 36 and then the motor 21 rotates the human-power transmitting reduction gear 36.

In the present embodiment, the second intermediate-shaft reduction gear 38 is integrally formed on the intermediate shaft 44, whereas the third intermediate-shaft reduction gear 39 is fixed with a different component from the intermediate shaft 44 by press fitting or serration coupling so as to be integrally rotated with the intermediate shaft 44. The third intermediate-shaft reduction gear 39 is slightly larger in diameter than the second intermediate-shaft reduction gear 38. The combined-force reduction gear 41 engaged with the third intermediate-shaft reduction gear 39 is slightly smaller in diameter than the human-power transmitting reduction gear 36 engaged with the second intermediate-shaft reduction gear 38. Thus, when the second intermediate-shaft reduction gear 38 and the third intermediate-shaft reduction gear 39 are integrally rotated with the intermediate shaft 44, the combined-force reduction gear 41 rotates faster than the human-power transmitting reduction gear 36.

Figure 7:
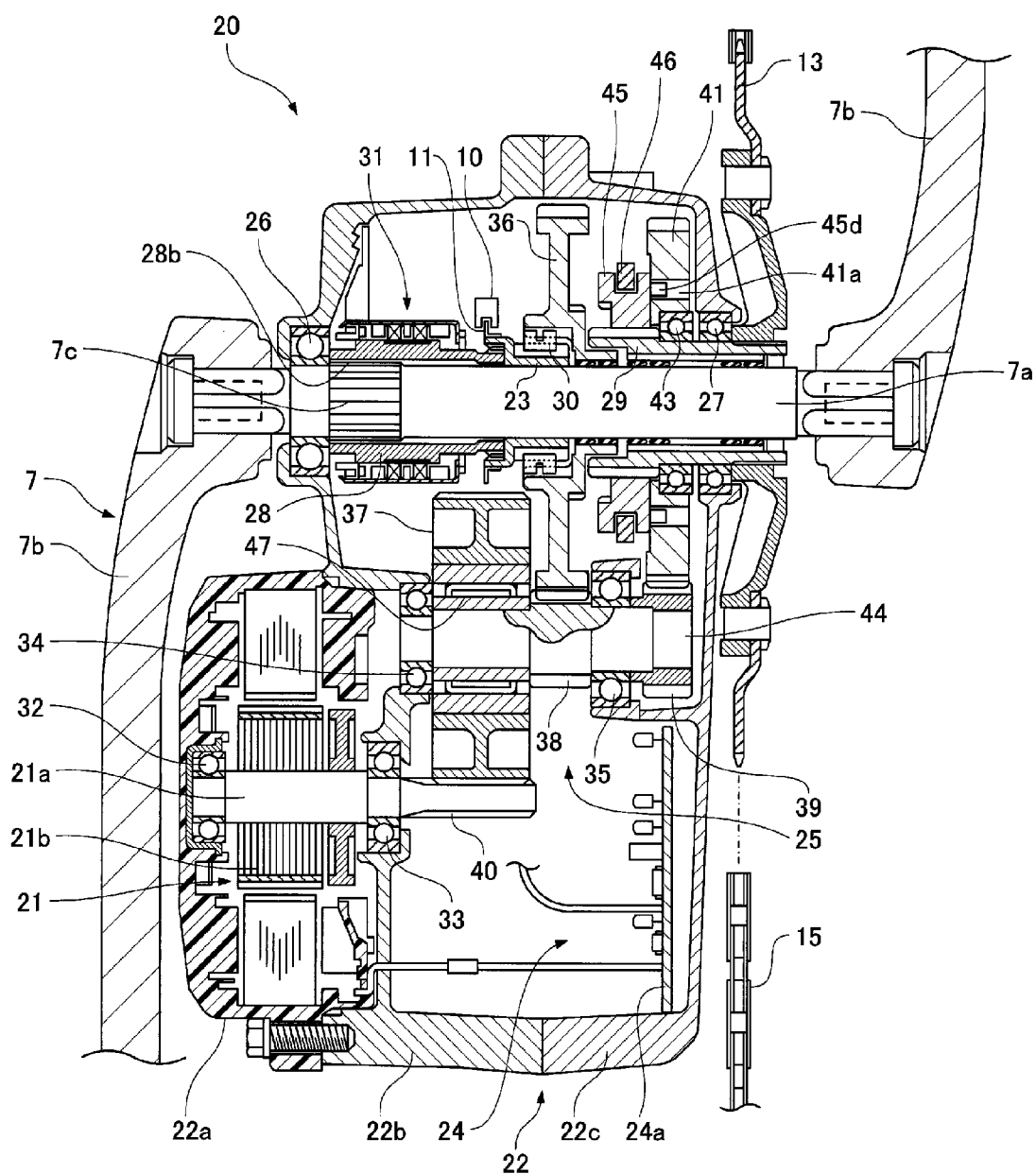
FIG. 7 is a plan sectional view showing the motor drive unit of the electric assist bicycle with the gear changing unit set at a second speed.

The selection clutch 45 has teeth 45c formed on the inner periphery of the left side of the selection clutch 45, the teeth 45c being engageable with teeth 36a formed on the human-power transmitting reduction gear 36. As shown in FIGS. 4 and 5, when the selection clutch 45 is placed on the left side, the teeth 45c of the selection clutch 45 are engaged with the teeth 36a of the human-power transmitting reduction gear 36 and the rotary force of the human-power transmitting reduction gear 36 is transmitted to the combined-force transmission member 29 through the selection clutch 45. Moreover, a plurality of engaging protrusions 45d are laterally formed from the right side of the selection clutch 45 so as to be engaged with a plurality of engaging holes 41a circumferentially formed on the combined-force reduction gear 41. As shown in FIG. 7, when the selection clutch 45 is located on the right side, the engaging protrusions 45d of the selection clutch 45 are inserted into engagement with the engaging holes 41a of the combined-force reduction gear 41 so as to transmit the rotary force of the combined-force reduction gear 41 to the combined-force transmission member 29 through the selection clutch 45. If the selection clutch 45 is disposed at the intermediate position (not shown) between the left position in FIGS. 4 and 5 and the right position in FIG. 7, the selection clutch 45 is not engaged with the human-power transmitting reduction gear 36 or the combined-force reduction gear 41.

Figure 6B:
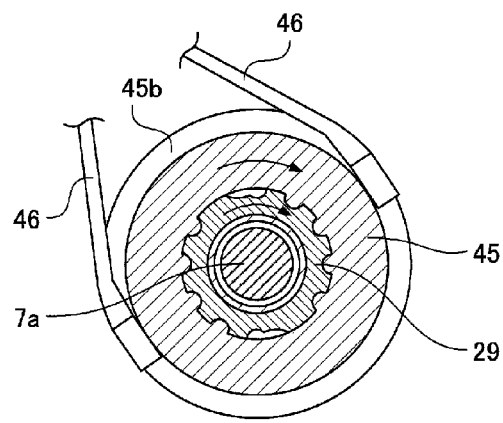
Figure 6C:
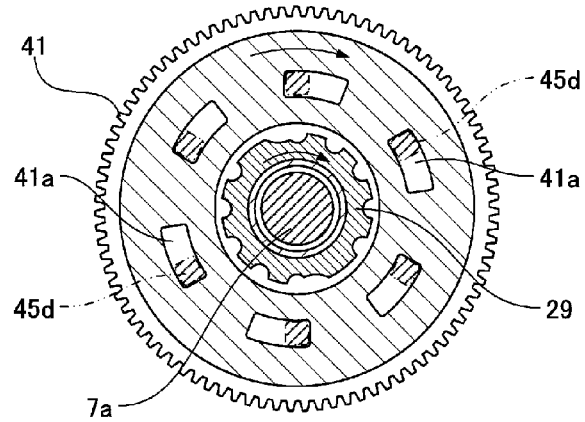

In the present embodiment, as schematically shown in FIGS. 3(b) and 6(b), the clutch driving part 46 for driving the selection clutch 45 holds the selection clutch 45 with a forked end so as to move along a guide rod 48 laterally extending in parallel with the crank shaft 7a. The clutch driving part 46 is interlocked through a wire or the like with the manual gear change part 18 attached to the handle bar 5 and so on. An operation on the manual gear change part 18 laterally moves the selection clutch 45 through the clutch driving part 46.

With this configuration, if the manual gear change part 18 is operated to a first speed, the selection clutch 45 is placed at the left position shown FIGS. 4 and 5, engaging the teeth 45c of the selection clutch 45 with the teeth 36a of the human-power transmitting reduction gear 36.

In this state, a forward rotation of the pedal 8 transmits a human driving force from the pedal 8 to the human-power transmission member 28 through the crank shaft 7a and then transmits the human driving force to the human-power transmitting reduction gear 36 through the interlocking cylindrical part 23 and the one-way clutch (one-way clutch for interrupting an auxiliary driving force) 30. At this point, the torque sensor 31 detects the torque of the human driving force and then the motor 21 is driven to output an auxiliary driving force corresponding to the torque. Subsequently, a turning force from the motor 21 is transmitted to the human-power transmitting reduction gear 36 through the first intermediate-shaft reduction gear 37, the one-way clutch (one-way clutch for interrupting a human driving force) 47, the intermediate shaft 44, and the second intermediate-shaft reduction gear 38 while the speed is reduced (the torque is increased). At this point, the combined-force reduction gear 41 engaged with the third intermediate-shaft reduction gear 39 is also rotated in response to the rotation of the intermediate shaft 44 but the combined-force reduction gear 41 is not engaged with the selection clutch 45, and therefore simply runs idle.

An auxiliary driving force transmitted to the human-power transmitting reduction gear 36 is combined with a human driving force on the human-power transmitting reduction gear 36. The combined force is transmitted to the selection clutch 45 through the teeth 36a and 45c, is transmitted to the combined-force transmission member 29 through the spline parts 45a and 29a, and then is transmitted to the rear wheel 4 through the chain 15 from the driving sprocket 13 attached to the combined-force transmission member 29. This rotates the rear wheel 4.

If the manual gear change part 18 is operated to a second speed, as shown in FIG. 7, the selection clutch 45 moves to the right position so as to separate the teeth 45c of the selection clutch 45 from the teeth 36a of the human-power transmitting reduction gear 36. After that, the engaging protrusions 45d of the selection clutch 45 are fit into engagement with the engaging holes 41a of the combined-force reduction gear 41.

In this state, as in the setting to the first speed, a forward rotation of the pedal 8 transmits a human driving force from the pedal 8 to the human-power transmitting reduction gear 36 through the crank shaft 7a, the human-power transmission member 28, the interlocking cylindrical part 23, and the one-way clutch (one-way clutch for interrupting an auxiliary driving force) 30 and then transmits the human driving force to the intermediate shaft 44 from the human-power transmitting reduction gear 36 through the second intermediate-shaft reduction gear 38. When the torque sensor 31 detects the torque of the human driving force and an auxiliary driving force corresponding to the torque is outputted from the motor 21, a turning force from the motor 21 is transmitted to the intermediate shaft 44 through the first intermediate-shaft reduction gear 37 and the one-way clutch (one-way clutch for interrupting a human driving force) 47. This combines the human driving force and the auxiliary driving force on the intermediate shaft 44.

The combined force on the intermediate shaft 44 is transmitted to the combined-force reduction gear 41 through the third intermediate-shaft reduction gear 39 and then the engaging protrusions 45d are fit into the engaging holes 41a of the combined-force reduction gear 41 so as to engage the selection clutch 45. This transmits the combined force to the selection clutch 45. Moreover, the combined force is transmitted to the driving sprocket 13 through the combined-force transmission member 29 and then is transmitted from the driving sprocket 13 to the rear 4 through the chain 15, rotating the rear wheel 4. The turning force (combined force) of the combined-force reduction gear 41 that rotates faster than the human-power transmitting reduction gear 36 is transmitted to the combined-force transmission member 29 and the driving sprocket 13. This rotates the driving sprocket 13 at the second speed higher than the first speed.

With this configuration, the selection clutch 45 is selectively engaged with the human-power transmitting reduction gear 36 or the combined-force reduction gear 41. This can satisfactorily transmit the combined force to the rear wheel 4 while changing gears. Gears are changed for the combined force of a human driving force and an auxiliary driving force instead of only one of a human driving force and an auxiliary driving force. This can satisfactorily change gears for a combined force corresponding to a human driving force (a combined force substantially proportionate to a human driving force) using the motor 21 capable of outputting an auxiliary driving force that can be satisfactorily combined with a human driving force or the speed reduction mechanism 25, achieving highly reliable riding.

According to the present embodiment of the present invention, the speed reduction mechanism 25 provided in the motor drive unit 20 constitutes the gear changing unit (gear changing mechanism) but a so-called external derailleur having multiple driving sprockets is not provided. This eliminates the need for a chain having small dimensions (a small thickness) relative to a vehicle width direction required for providing an external derailleur in a single-shaft motor drive unit, thereby preventing a chain from having quite a short life expectancy that may cause frequent replacement of components or an insufficient auxiliary driving force. Furthermore, the need for a front derailleur is eliminated and thus any problems do not arise as to the location of a front derailleur. The human-power transmission member 28, the combined-force transmission member 29, and the speed reduction mechanism 25 are provided in the motor drive unit 20 so as to be protected from the outside. Thus, these components are hardly damaged during traveling, keeping high reliability.

Moreover, the combined force of a human driving force and an auxiliary driving force is transmitted with the engagement of the intermediate-shaft reduction gears 37, 38, and 39 provided on the intermediate shaft 44, the human-power transmitting reduction gear 36 rotatably provided on the outer periphery of the crank shaft 7a disposed in parallel with the intermediate shaft 44, and the combined-force reduction gear 41 rotatably provided on the combined-force transmission member 29. This can advantageously improve the transmission efficiency of a torque (force) as compared with the use of a planet gear mechanism.

In this configuration, the one-way clutch 30 for interrupting an auxiliary driving force is provided on a transmission path for a human driving force between the crank shaft 7a and the human-power transmitting reduction gear 36, the one-way clutch 30 preventing the transmission of an auxiliary driving force from the motor 21 to the crank shaft 7a. The one-way clutch 30 for interrupting an auxiliary driving force transmits a human driving force in a forward direction from the human-power transmission member 28 and the interlocking cylindrical part 23 to the human-power transmitting reduction gear 36 but does not transmit an auxiliary driving force in a forward direction from the intermediate shaft 44 and the human-power transmitting reduction gear 36 to the crank shaft 7a and the pedals 8 through the interlocking cylindrical part 23 and the human-power transmission member 28. In the electric assist bicycle 1, even if a rider stops pressing the pedals 8, so-called delay control is performed so as to keep the rotation of the motor 21 for a while. The one-way clutch 30 for interrupting an auxiliary driving force cuts the auxiliary driving force to prevent continuous rotations of the crank shaft 7a and the pedals 8 by themselves, as a result, even if a rider stops pressing the pedals 8, preventing continuous rotations of the crank shaft 7a and the pedals 8 by themselves, thereby improving convenience.

With this configuration, the one-way clutch 47 for interrupting a human driving force is disposed between the intermediate shaft 44 and the first intermediate-shaft reduction gear 37 so as to prevent the transmission of a human driving force from the human-power transmitting reduction gear 36 to the motor 21. Thus, if the battery 12 runs out and the pedals 8 are pressed without the output of an auxiliary driving force from the motor 21, a human driving force rotates the intermediate shaft 44 and the second and third intermediate-shaft reduction gears 38 and 39 but does not rotate the first intermediate-shaft reduction gear 37 and the rotating shaft 21a and the rotor portion 21b of the motor 21, preventing the application of an excessive force to the pedals 8 (a so-called drag resistance can be considerably reduced).

With this configuration, the interlocking cylindrical part 23 is provided between the human-power transmission member 28 and the human-power transmitting reduction gear 29. Also in the case where the magneto-striction generation portion 31b of the torque sensor 31 for detecting a human driving force is formed on the human-power transmission member 28, vibrations during the switching of the selection clutch 45 and vibrations from the one-way clutch 30 for interrupting an auxiliary driving force are hardly transmitted to the human-power transmission member 28. Thus, the torque sensor 31 is more reliable than in the absence of the interlocking cylindrical part 23.

This configuration further includes the rotation detector 10 that detects the rotation of the interlocking cylindrical part 23, thereby satisfactorily detecting the rotations of the interlocking cylindrical part 23 and the human-power transmission member 28, that is, the rotation of the crank shaft 7a. An optical sensor provided as the rotation detector 10 advantageously protects the torque sensor 31 from magnetism. The rotation detector 10 is not limited to an optical sensor and thus may be a magnetic sensor. Furthermore, a magnetic shield for blocking magnetism between the magnetic sensor and the torque sensor 31 may be provided.

In the present embodiment, the gear changing unit has a structure capable of switching between two speeds (two steps), specifically, a first speed and a second speed (so-called two-speed gear mechanism). The gear changing unit is not limited to this configuration and thus may switch among three or more speeds.

Figure 8:
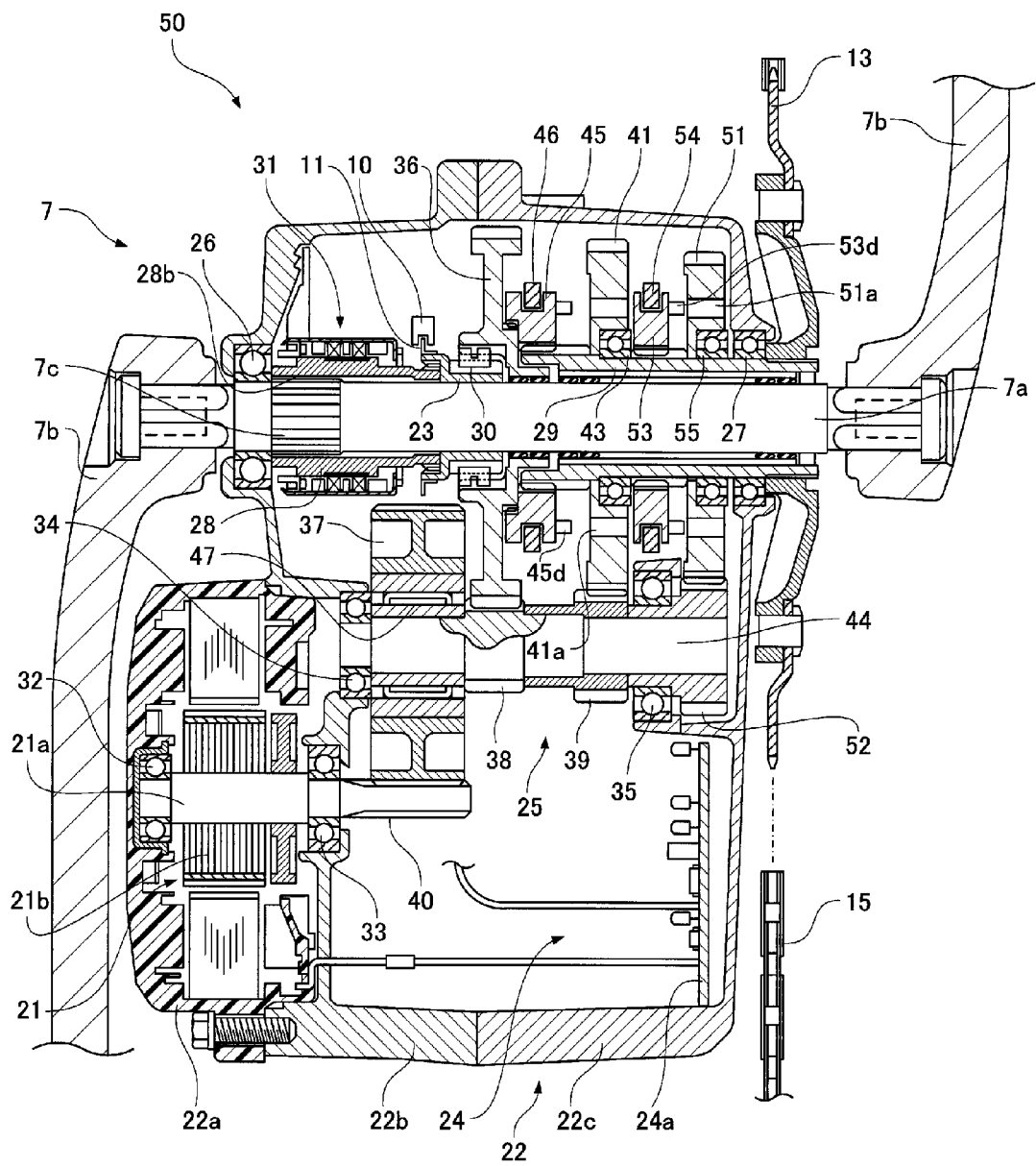
FIG. 8 is a plan sectional view showing the motor drive unit (having a three-speed gear changing unit) of an electric assist bicycle with the gear changing unit set at a first speed according to another embodiment of the present invention.
Figure 9:
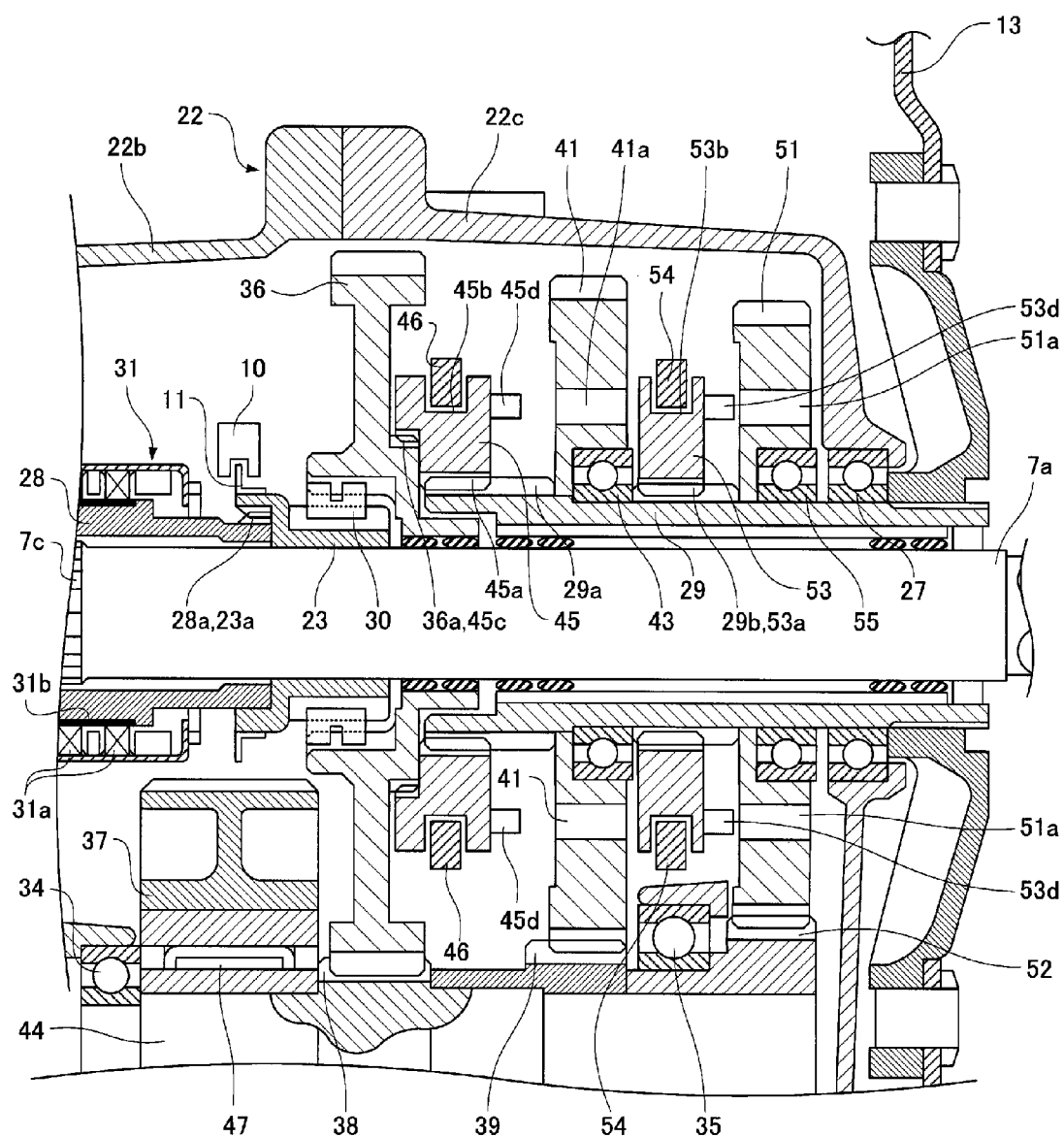
FIG. 9 is an enlarged plan sectional view showing the principal part of the motor drive unit of the electric assist bicycle.

FIGS. 8 to 11 show a motor drive unit 50 having a so-called three-speed gear structure according to another embodiment of the present invention. As shown in FIGS. 8 and 9, in addition to the configuration of the gear changing mechanism 25 in the motor drive unit 20 according to the foregoing embodiment, the motor drive unit 50 further includes the following constituent elements: a gear changing mechanism 25 in the motor drive unit 50 includes a fourth intermediate-shaft reduction gear 52 having a relatively small diameter provided on an intermediate shaft 44, a large-diameter second combined-force reduction gear 51 that is rotatably provided on a combined-force transmission member 29 via a bearing 55 and is engaged with the small-diameter fourth intermediate reduction gear 52, a selection clutch 53 that is integrally rotated in laterally movable engagement with the combined-force transmission member 29 via spline parts 29b and 53a (specifically, along the axial direction of a crank shaft 7a) and is selectively engaged with a combined-force reduction gear 41 (will be referred to as a first combined-force reduction gear 41) or the second combined-force reduction gear 51, and a clutch driving part 54 that is laterally movably engaged with a groove portion 53b formed on the outer periphery of the selection clutch 53 so as to laterally move the selection clutch 53 selectively into engagement with the first combined-force reduction gear 41 or the second combined-force reduction gear 51.

The fourth intermediate-shaft reduction gear 52 is slightly larger in diameter than a third intermediate-shaft reduction gear 39 and the second combined-force reduction gear 51 engaged with the fourth intermediate-shaft reduction gear 52 is slightly smaller in diameter than the first combined-force reduction gear 41 engaged with a third intermediate-shaft reduction gear 38. Thus, when a human-power transmitting reduction gear 36 is rotated, the second intermediate-shaft reduction gear 38 engaged with the human-power transmitting reduction gear 36 is rotated, the third intermediate-shaft reduction gear 39 and the fourth intermediate-shaft reduction gear 52 rotate at the same rpm as the second intermediate-shaft reduction gear 38 via the intermediate shaft 44 having the second intermediate-shaft reduction gear 38 formed, and the first combined-force reduction gear 41 engaged with the third intermediate-shaft reduction gear 39 and the second combined-force reduction gear 51 engaged with the fourth intermediate-shaft reduction gear 52 rotate in synchronization with one another. At this point, the first combined-force reduction gear 41 rotates faster than the human-power transmitting reduction gear 36 and the second combined-force reduction gear 51 rotates faster than the first combined-force reduction gear 41.

Like a selection clutch (also referred to as a first selection clutch) 45, the selection clutch (also referred to as a second selection clutch) 53 has engaging protrusions 53d formed that laterally protrude from the right side of the selection clutch 53. The engaging protrusions 53d of the second selection clutch 53 can be engaged with engaging holes 51a circumferentially formed on the second combined-force reduction gear 51. As shown in FIG. 11, the second selection clutch 53 is disposed on the right side, the engaging protrusions 53d of the second selection clutch 53 are inserted into engagement with the engaging holes 51a of the second combined-force reduction gear 51, transmitting the rotary force of the second combined-force reduction gear 51 to the combined-force transmission member 29 through the second selection clutch 53. The second selection clutch 53 disposed on the left side as shown in FIGS. 8 to 10 is not engaged with the second combined-force reduction gear 51 or, as a matter of course, the first combined-force reduction gear 41.

With this configuration, if a manual gear change part 18 is operated to a first speed, the first selection clutch 45 is set at the left position of FIGS. 8 and 9 so as to be engaged with the human-power transmitting reduction gear 36. Thus, as in the setting to the first speed in the foregoing embodiment, a driving sprocket 13 is rotated at a relatively low speed (first speed) relative to the rotations of pedals 8 so as to rotate a rear wheel 4, thereby keeping traveling.

Figure 10:
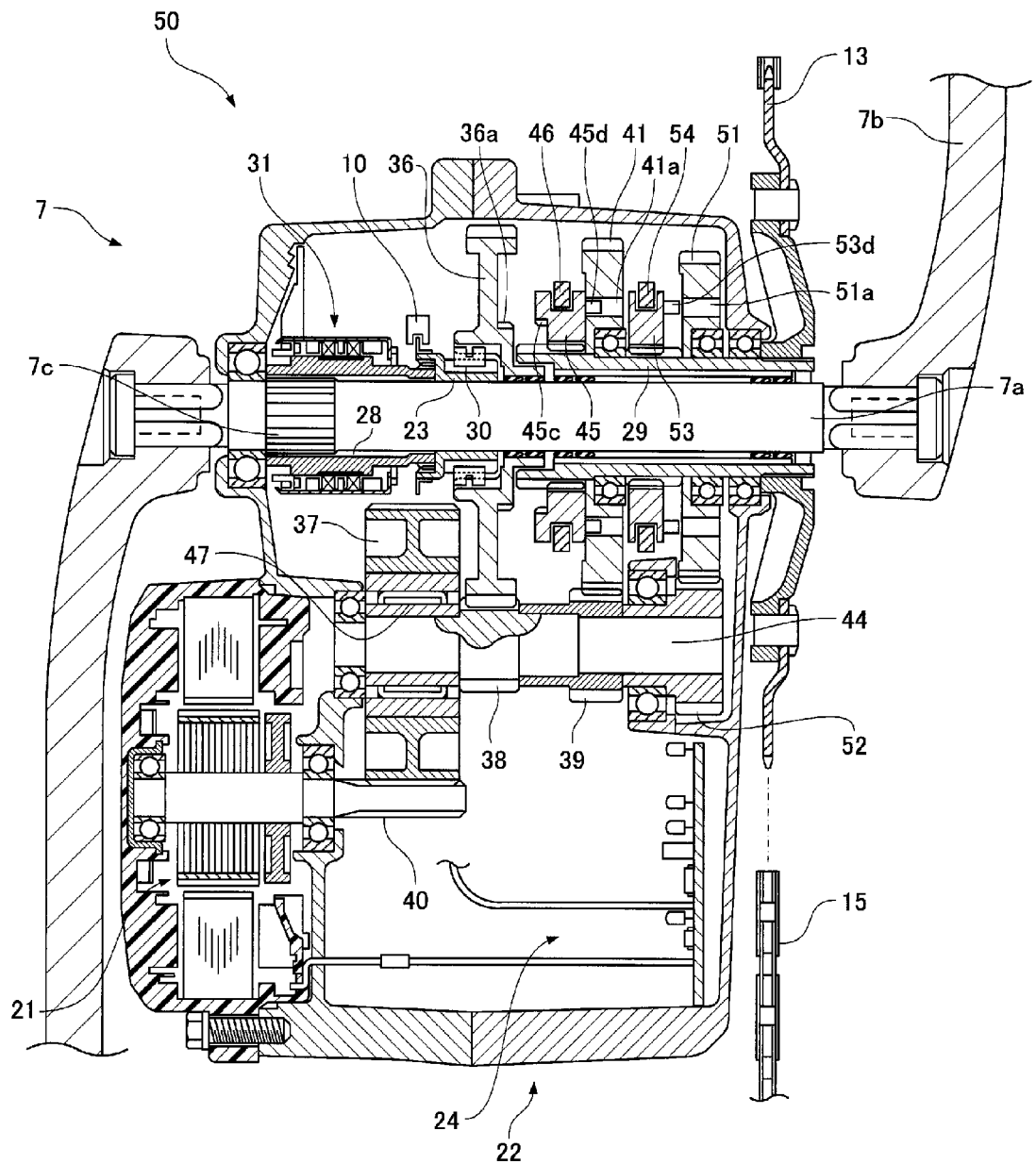
FIG. 10 is a plan sectional view showing the motor drive unit of the electric assist bicycle with the gear changing unit set at a second speed.
Figure 11:
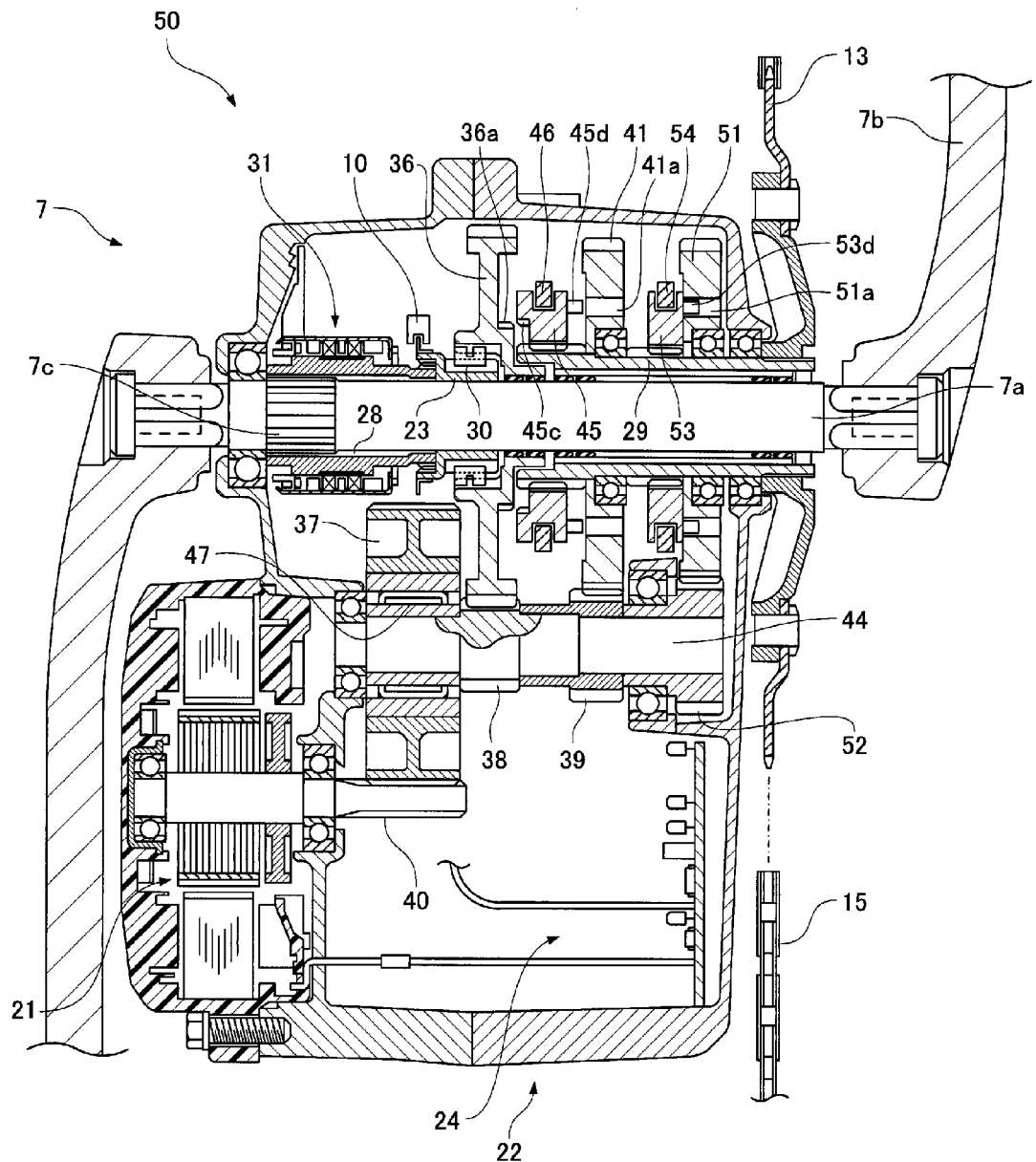
FIG. 11 is a plan sectional view showing the motor drive unit of the electric assist bicycle with the gear changing unit set at a third speed.

If the manual gear change part 18 is operated to a second speed, the first selection clutch 45 is set at the right position of FIG. 10 so as to be engaged with the first combined-force reduction gear 41. Thus, as in the setting to the second speed in the foregoing embodiment, the driving sprocket 13 is rotated at a relatively high speed (second speed) relative to the rotations of the pedals 8 so as to rotate the rear wheel 4, thereby keeping traveling. If the manual gear change part 18 is set at the first and second speeds, a second selection clutch 43 is set at the left position and is not engaged with the second combined-force reduction gear 51.

If the manual gear change part 18 is operated to a third speed, as shown in FIG. 11, the first selection clutch 45 moves to the intermediate position and is not engaged with the human-power transmitting reduction gear 36 or the first combined-force reduction gear 41. Meanwhile, the second selection clutch 53 is set at the right position with the engaging protrusions 53d thereof inserted into engagement with the engaging holes 51a of the second combined-force reduction gear 51.

Thus, when the pedals 8 are rotated forward in this state, a human driving force from the pedal 8 is transmitted to the human-power transmitting reduction gear 36 through the crank shaft 7a, a human-power transmission member 28, an interlocking cylindrical part 23, and a one-way clutch (one-way clutch for interrupting an auxiliary driving force) 30 as in the setting to the second speed. Subsequently, the human driving force is transmitted from the human-power transmitting reduction gear 36 to the intermediate shaft 44 through the second intermediate-shaft reduction gear 38. Moreover, an auxiliary driving force corresponding to the human driving force is outputted from a motor 21 and a turning force from the motor 21 is transmitted to the intermediate shaft 44 through a first intermediate-shaft reduction gear 37 and a one-way clutch (one-way clutch for interrupting a human driving force) 47. This combines the human driving force and the auxiliary driving force on the intermediate shaft 44.

Subsequently, the combined force of the intermediate shaft 44 is transmitted to the second combined-force reduction gear 51 through the fourth intermediate-shaft reduction gear 52 and then is transmitted to the driving sprocket 13 through the second selection clutch 53 and the combined-force transmission member 29, rotating the driving sprocket 13 at the third speed higher than the second speed.

With this configuration, the first and second selection clutches 45 and 53 are selectively engaged with the human-power transmitting reduction gear 36 or the first and second combined-force reduction gears 41 and 51, thereby satisfactorily transmitting a combined force to the rear wheel 4 with a gear change from the first speed to the third speed. Similarly, gears can be changed in multiple steps, for example, at least four steps by adding an intermediate-shaft reduction gear, a combined-force reduction gear, a selection clutch, and so on.

Figure 12:
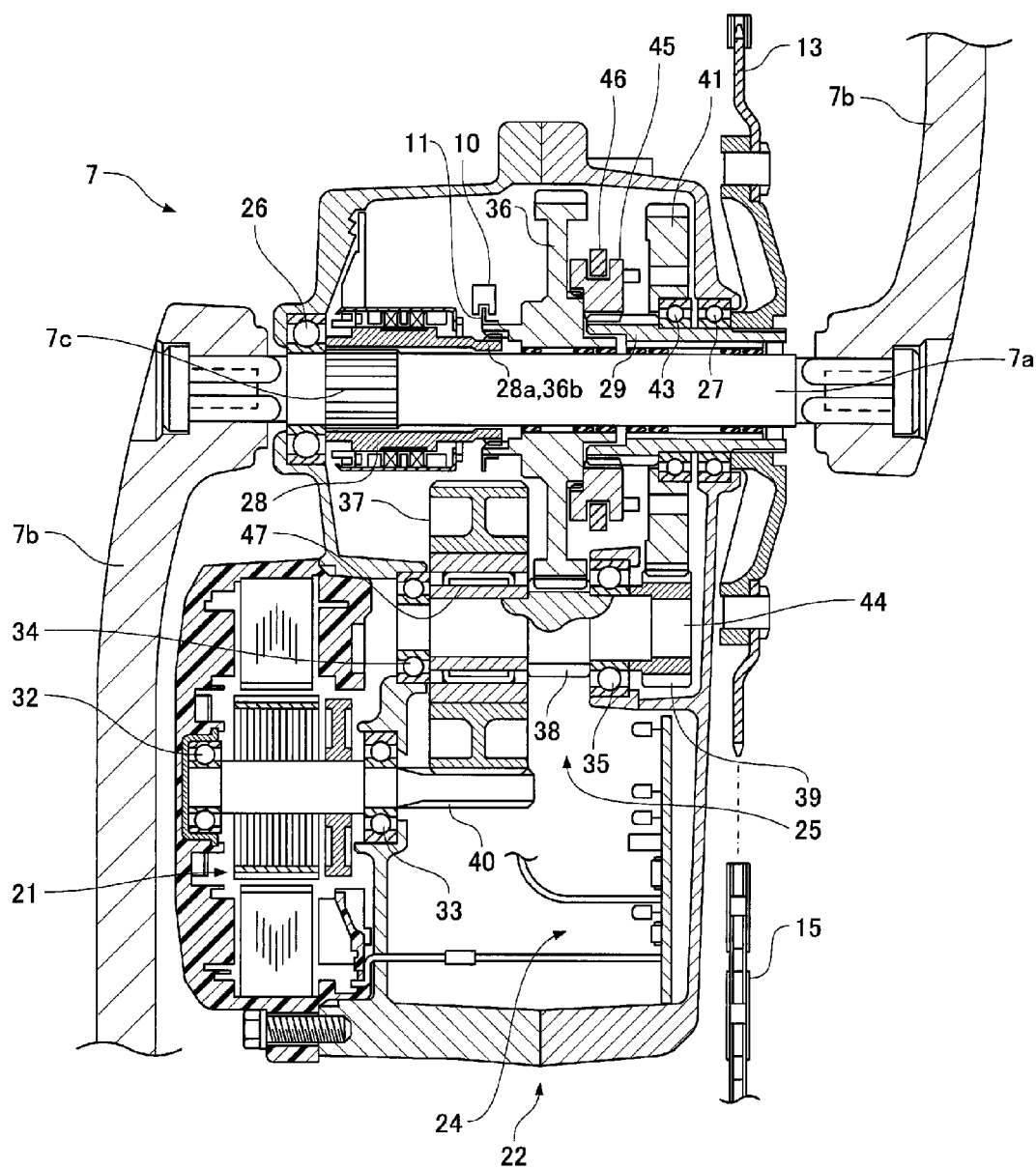
FIG. 12 is a plan sectional view showing the motor drive unit of an electric assist bicycle (having a two-speed gear changing unit) according to still another embodiment of the present invention.
Figure 13:
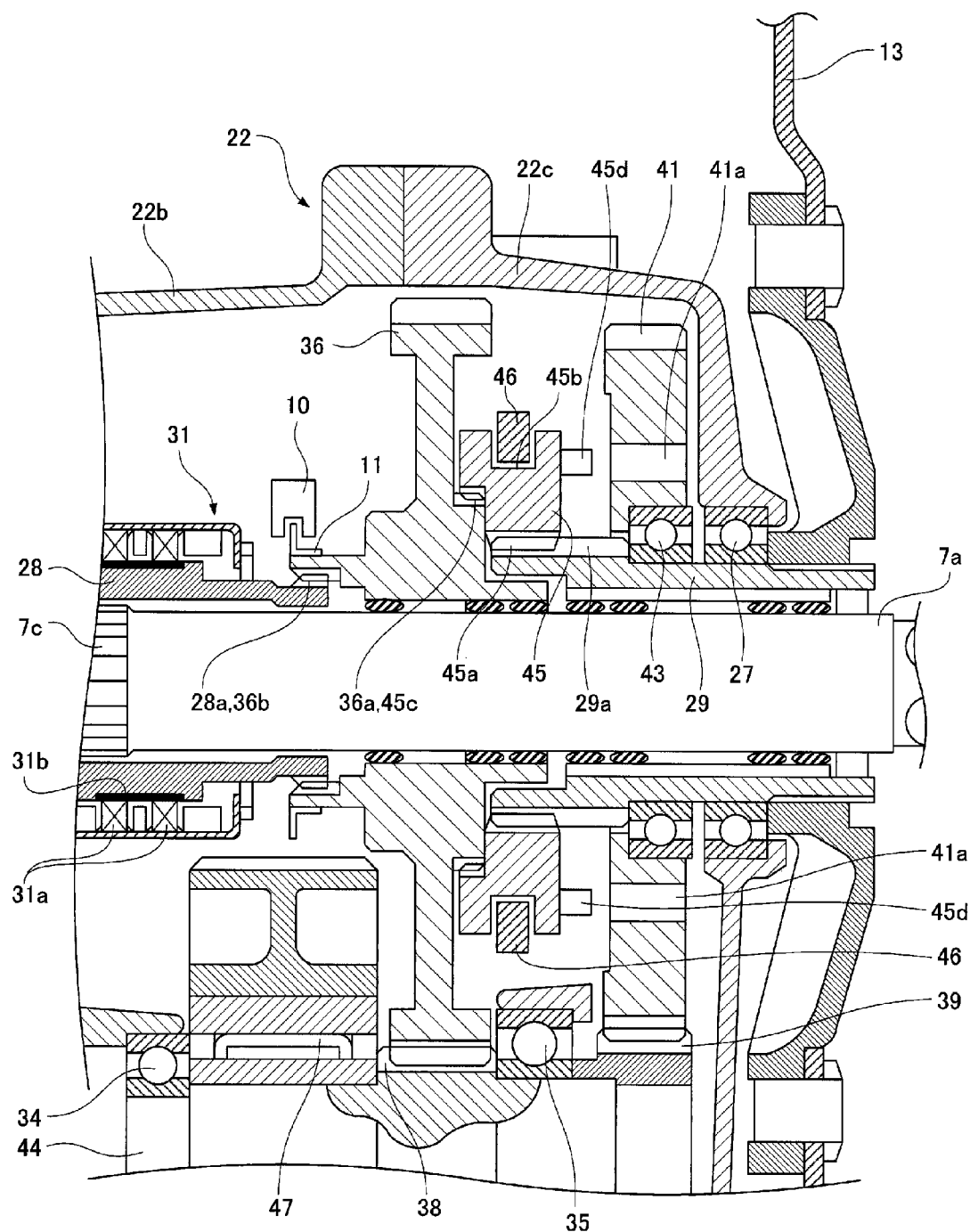
FIG. 13 is an enlarged plan sectional view showing the principal part of the motor drive unit of the electric assist bicycle.
Figure 14:
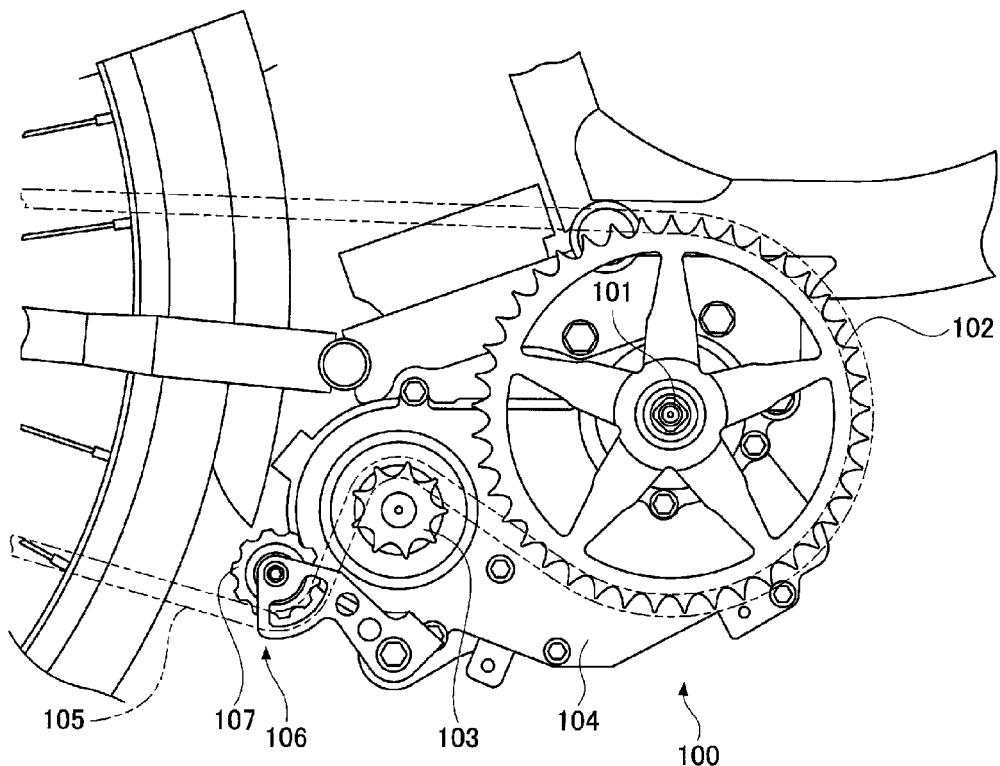
FIG. 14 is a side view showing a double-shaft motor drive unit in a conventional electric assist bicycle and a location near the motor drive unit.
Figure 15:
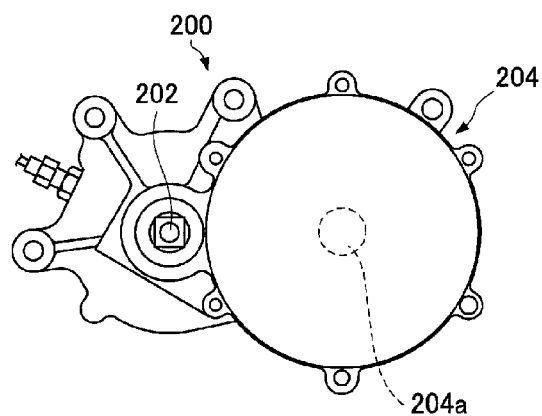
FIG. 15 is a side view showing a single-shaft motor drive unit in the conventional electric assist bicycle.
Figure 16:
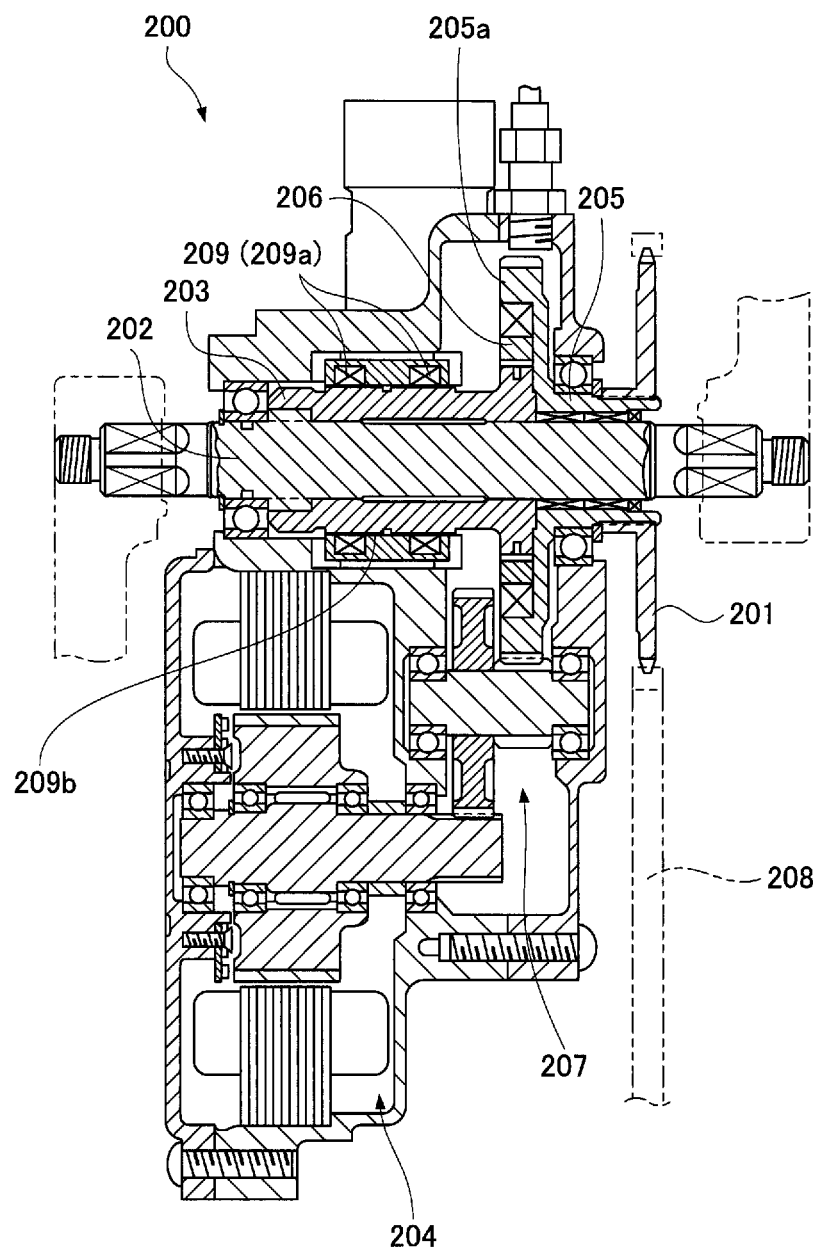
FIG. 16 is a plan sectional view showing the single-shaft motor drive unit.

In the present embodiment, the one-way clutch 30 for interrupting an auxiliary driving force is disposed between the human-power transmission member 28 having a magneto-striction generation portion 31b of a torque sensor 31 formed and the combined-force transmission member 29 where the driving sprocket 13 is attached (in the present embodiment, between the interlocking cylindrical part 23 and the human-power transmitting reduction gear 36). The present invention is not limited to this configuration. The one-way clutch 30 for interrupting an auxiliary driving force may not be provided. For example, as shown in FIGS. 12 and 13, the human-power transmission member 28 and the human-power transmitting reduction gear 36 may be integrally rotated while being engaged at serration parts (or spline parts) 28a and 36b.

In this case, even if a rider stops pressing the pedals 8, so-called delay control keeps driving the motor 21 for a while. This may allow the crank shaft 7a and the pedals 8 to continuously rotate by themselves. Thus, in order to prevent such a phenomenon, it is preferable to immediately stop or brake the motor 21 when the rotation detector 10 quickly detects, according to the rotational state of the combined-force transmission member 29, the human-power transmission member 28, or the crank shaft 7a, that a rider stops pressing the pedals 8.

With this configuration, a reversed rotation of the pedal 8 is smoothly transmitted from the crank shaft 7a to the rear wheel 4 through the combined-force transmission member 29, the human-power transmission member 28, the driving sprocket 13, a chain 15, and so on. For example, the hub of the rear wheel may have a coaster brake that operates when the pedals are rotated opposite to a forward rotation. Specifically, in this case, a reversed rotation of the pedal 8 is transmitted through the chain 15 and so on to the coaster brake provided on the hub of the rear wheel 4. This can satisfactorily operate the coaster brake.

In the present embodiment, a clutch driving part 46 that drives the selection clutches 45 and 53 is movable along a guide rod 48 laterally extending in parallel with the crank shaft 7a. In this state, the clutch driving part 46 moves the selection clutch 45 held with the forked end of the clutch driving part 46. The present invention is not limited to this configuration. For example, the selection clutch may be moved using a cam mechanism or using a clutch driving part that swings about a support point.

INDUSTRIAL APPLICABILITY

The present invention is applicable to various electric assist bicycles, each being capable of traveling with a combination of a human driving force generated by a pedal force from a pedal and an auxiliary driving force generated by a motor.

The invention claimed is:

1. An electric assist bicycle comprising a motor drive unit with a motor disposed at an intermediate position between a front wheel and a rear wheel, the electric assist bicycle being capable of traveling with a combination of a human driving force generated by a pedal force from a pedal and an auxiliary driving force generated by the motor,
the electric assist bicycle comprising a crank shaft that receives the human driving force transmitted from the pedal and rotates about an axis that is different from an axis of the motor,
the crank shaft having a cylindrical human-power transmission member on an outer periphery of the crank shaft, the human-power transmission member receiving the transmitted human driving force,
the crank shaft having a combined-force transmission member on the outer periphery of the crank shaft, the combined-force transmission member receiving a combined force of the human driving force and the auxiliary driving force from the motor,
the electric assist bicycle comprising a speed reduction mechanism that has pairs of reduction gears and a selection clutch engageable with the reduction gears, combines the human driving force and the auxiliary driving force, and changes gears for the combined force of the human driving force and the auxiliary driving force,
the motor drive unit containing the human-power transmission member, the combined-force transmission member, and the speed reduction mechanism,
wherein the combined force transmitted to the combined-force transmission member through the speed reduction mechanism is transmitted to the rear wheel through a driving force output wheel coaxial with the crank shaft and an endless driving force transmission member looped over the driving force output wheel,
the speed reduction mechanism includes a human-power transmitting reduction gear that is rotatably disposed on the outer periphery of the crank shaft and receives the human driving force, an intermediate shaft disposed in parallel with the crank shaft, a plurality of intermediate-shaft reduction gears provided on the selection clutch that is rotated integrally with the combined-force transmission member engaged with the selection clutch and is selectively engaged with one of the human-power transmitting reduction gear and the combined-force reduction gear.

2. The electric assist bicycle according to claim 1, wherein the human-power transmission member has a magnetostriction generation portion of a torque sensor for detecting the human driving force formed.

3. The electric assist bicycle according to claim 1, further comprising a one-way clutch for interrupting the auxiliary driving force on a transmission path of the human driving force between the crank shaft and the human-power transmitting reduction gear, the one-way clutch preventing transmission of the auxiliary driving force from the motor to the crank shaft.

4. The electric assist bicycle according to claim 3, further comprising an interlocking cylindrical part disposed on the outer periphery of the crank shaft so as to be engaged with the human-power transmission member,
wherein the one-way clutch for interrupting the auxiliary driving force is disposed between the interlocking cylindrical part and the human-power transmitting reduction gear.

5. The electric assist bicycle according to claim 4, further comprising a rotation detector that detects a rotation of one of the interlocking cylindrical part and the human-power transmission member.

6. The electric assist bicycle according to claim 1, wherein a one-way clutch is not disposed on a transmission path of the human driving force between the crank shaft and the human-power transmitting reduction gear, and the human-power transmission member and the human-power transmitting reduction gear are also rotated in response to a rotation of the crank shaft regardless of a rotation direction of the crank shaft and the human-power transmission member relative to the human-power transmitting reduction gear.

7. The electric assist bicycle according to claim 6, further comprising a coaster brake disposed on a hub of the rear wheel, the coaster brake being started when the pedal is rotated opposite to a forward rotation direction.

* * * * *